United States Patent [19]

Chewning, III et al.

[11] Patent Number: 5,416,831
[45] Date of Patent: May 16, 1995

[54] SYSTEM FOR COMMUNICATING WITH AN ADSI-COMPATIBLE TELEPHONE VIA A SERVICE CIRCUIT NODE

[75] Inventors: Ward M. Chewning, III, Lawrenceville; Lara F. Morgan, Norcross; Anita Hogans-Owens, Decatur, all of Ga.

[73] Assignee: BellSouth Corporation, Atlanta, Ga.

[21] Appl. No.: 48,650

[22] Filed: Apr. 15, 1993

[51] Int. Cl.⁶ .......................................... H04M 11/00
[52] U.S. Cl. ...................................... 379/96; 379/97; 379/201
[58] Field of Search .................. 379/89, 88, 63, 201, 379/207, 269, 52, 97, 93, 96, 98, 99

[56] References Cited

U.S. PATENT DOCUMENTS 5,247,347  9/1993  Litteral et al. .................... 348/14
5,253,285 10/1993  Alheim ............................. 379/52
5,283,731  2/1994  Lalonde et al. ................... 364/401

OTHER PUBLICATIONS

"A-I-Net TM Products", AT&T, draft, 270-730-010 Issue 1, Apr. 1992.
Bell Communications Research, "Guidelines For Writing Applications Which Use The Analog Display Services Interface (ADSI) For Data Communications," Special Report SR-NWT-002495, Issue 1, Dec. 1992.
Bell Communications Research, "Customer Premises Equipment Compatibility Considerations For The Analog Display Services Interface," Draft Special Report SR-INS-002461, Issue 1, Oct. 1992.
Bell Communications Research, "Generic Requirements For An SPCS To Customer Premises Equipment Data Interface For Analog Display Services," Technical Reference TR-NWT-001273, Issue 1, Dec. 1992.
Northern Telecom, NTI-Issue 1, May 23, 1991.

Primary Examiner—Wing F. Chan
Attorney, Agent, or Firm—Jones & Askew

[57] ABSTRACT

A telephone display system (10) for communicating data via a service circuit node (11) connected to a PSTN (13) for presentation by a visual display (26) connected to an Analog Display Service Interface (ADSI)-compatible telephone (14). In response to a service selection signal carried by an incoming telephone line (21), the service circuit node (11) generates information signals containing textual information and telephone instructions. The service circuit node (11) also connects the incoming telephone line (21) to an adjunct processor (12) and sends the information signals to the adjunct processor (12). In response, the adjunct processor (12) modulates a carrier in accordance with the digital information signals and transmits the resulting analog information data over the telephone line (21). If the telephone instructions include an initial instruction for causing the ADSI-compatible telephone to enter a data mode, the adjunct processor also converts the digital initial instruction into an analog format for transmission over the telephone line. The visual display (26) enters the data mode and displays the textual information.

24 Claims, 20 Drawing Sheets

Menu 0 - Welcome

| 1 | ** Movie Hotline** | scroll down to start |
|---|---|---|
| 2 | Please select from | these options: |
| 3 | Cinema locations in<br>SELECT HELP QUIT | your area |
| 4 | Browse movies<br>SELECT HELP QUIT | showing in your area |
| 5 | Search for a movie<br>SELECT HELP QUIT | of your choice |

*FIG. 13*

Menu 1 - Cinemas

| 1 | Please select from | these cinemas: |
|---|---|---|
| 2 | 1. Litchfield 10 at<br>SELECT BACKUP RESTART | Gwinnet Place Mall<br>HELP QUIT |
| 3 | 2. Lawrenceville Town<br>SELECT BACKUP RESTART | Center on Hwy 120<br>HELP QUIT |
| 4 | 3. Cineplex/Odeon 6<br>SELECT BACKUP RESTART | in Snellville<br>HELP QUIT |
| 5 | 4. Mall Corners 8<br>SELECT BACKUP RESTART | 671 Pleasant Hill Rd<br>HELP QUIT |
| 6 | | |
| ... | | |
| 15 | | |

*FIG. 14*

Menu 2 - Choices

| 30 | Lawrenceville | Town Center |
|---|---|---|
| 31 | Movies Showing | and Times |
|  | SELECT BACKUP RESTART | HELP QUIT |
| 32 | Directions to the | Cinema |
|  | SELECT BACKUP RESTART | HELP QUIT |
| 33 | Prices and | Discounts |
|  | SELECT BACKUP RESTART | HELP QUIT |

*FIG. 15*

Menu 3 - Movies at Cinemas X

| 16 | Movies showing at | Lawrenceville |
|---|---|---|
| 17 | Last of the Mohicans | Rated PG13 |
|  | INFO TIMES RESERVE | BACKUP RESTART |
| 18 | Dracula | Rated R |
|  | INFO TIMES RESERVE | BACKUP RESTART |
| 19 | River Runs Through | Rated PG |
|  | INFO TIMES RESERVE | BACKUP RESTART |
| 20 | Passenger 57 | Rated R |
|  | INFO TIMES RESERVE | BACKUP RESTART |
| 21 | Wayne's World | Rated PG13 |
|  | INFO TIMES RESERVE | BACKUP RESTART |
| 22 | Hoffa | Rated R |
|  | INFO TIMES RESERVE | BACKUP RESTART |
| 23 |  |  |
| ... |  |  |
| 28 |  |  |

*FIG. 16*

Menu 4 - Directions

| 16 | Lawrenceville Town RETURN | Center Cinemas is |
|---|---|---|
| 17 | located at 1234 Hwy RETURN | 120 in Lawrenceville |
| 18 | Coming North on I-85 RETURN | take 316 north to |
| 19 | the exit for Hwy 120 RETURN | then turn right |
| 20 | The movies are in RETURN | the Kroger |
| 21 | shopping center a RETURN | mile down on the |
| 22 | right across from RETURN | the Wendy's |
| 23 ... 28 | | |

FIG. 17

Menu 5 - Prices

| 16 | Prices for movies  RETURN | after 5pm |
|---|---|---|
| 17 | Adults    12 and over  RETURN | $ 7.50 |
| 18 | Children    3 to 11  RETURN | $ 4.00 |
| 19 | Children    under 3  RETURN | FREE |
| 20 | Senior Citizens    65+  RETURN | $ 5.00 |
| 21 | Prices for movies  RETURN | before 5 pm |
| 22 | Adults    12 and over  RETURN | $ 4.00 |
| 23 | Children    3 to 11  RETURN | $ 2.00 |
| 24 ... 28 | | |

*FIG. 18*

Menu 6 - Times

| 33 | Times for Last Mhcns  RETURN | 2:10, 4:15, 7:00, 9:30 |
|---|---|---|

*FIG. 19*

Menu 7 - Date

| 30 | Please select date | to see movie: |
|---|---|---|
| 31 | March 11, 1993<br>SELECT CANCEL | |
| 32 | March 12, 1993<br>SELECT CANCEL | |
| 33 | March 13, 1993<br>SELECT CANCEL | |

FIG. 20

Menu 10 - Movie List

| 1 | Please select from | these movies |
|---|---|---|
| 2 | 1. Airplane<br>SELECT INFO PAGE | Rated PG<br>BACKUP RESTART |
| 3 | 2. Dracula<br>SELECT INFO PAGE | Rated R<br>BACKUP RESTART |
| 4 | 3. Dracula II<br>SELECT INFO PAGE | Rated R<br>BACKUP RESTART |
| 5 | 4. Drama City<br>SELECT INFO PAGE | Rated PG<br>BACKUP RESTART |
| ... | ... | |

FIG. 21

Menu 11(and Menu 19) - Sub-Cinemas

| 1 | Airplane | is showing at: |
|---|---|---|
| 2 | 1. Litchfield 10 at<br>SELECT BACKUP RESTART | Gwinnet Place Mall<br>HELP QUIT |
| 3 | 4. Mall Corners 8<br>SELECT BACKUP RESTART | 671 Pleasant Hill Rd<br>HELP QUIT |
| ... | | |

FIG. 22

Menu 12 - Time

| 30 | Please select time | to see movie: |
|---|---|---|
| 31 | 4:30 pm<br>SELECT CANCEL | |
| 32 | 7:00 pm<br>SELECT CANCEL | |
| 33 | 9:30 pm<br>SELECT CANCEL | |

FIG. 23

Menu 13 - Number of Tickets

| 33 | Enter number to buy:<br>SEND CLEAR CANCEL | -> |
|---|---|---|

FIG. 24

Menu 14 - Total

| 33 | 2 tickets cost | $10.00 |
|---|---|---|
|  | ORDER CANCEL |  |

*FIG. 25*

Menu 15 - Card Number

| 33 | -> | Enter credit card # |
|---|---|---|
|  | SEND CLEAR CANCEL |  |

*FIG. 26*

Menu 16 - Expiration Date

| 33 | -> | Enter exp date |
|---|---|---|
|  | SEND CLEAR CANCEL |  |

*FIG. 27*

Menu 17 - Pickup

| 33 | Pickup tickets at | Advance Sales window |
|---|---|---|
|  | RETURN |  |

*FIG. 28*

Menu 18 - Movie Search

| 33 | -> | Spell movie name |
|---|---|---|
|  | SEARCH CLEAR HELP | BACKUP RESTART |

*FIG. 29*

SYSTEM FOR COMMUNICATING WITH AN ADSI-COMPATIBLE TELEPHONE VIA A SERVICE CIRCUIT NODE

TECHNICAL FIELD

The present invention relates to telecommunications systems and, more particularly, to a system for communicating data via a service circuit node connected to a public switched telephone network for presentation by a visual display on an Analog Display Services Interface (ADSI)-compatible telephone.

BACKGROUND OF THE INVENTION

A wide variety of communications services are available to a user of a modern public switched telephone network (PSTN). Such services include voice mail systems, interactive voice response (IVR) systems, and personal identification number communication systems. Each of those services operates by supplying audio information, such as instructions or messages, to the user via a conventional wireline or wireless telephone. In response to the audio information, the user generally can select a desired service or a source of information by pressing one or more predetermined buttons on the dial pad of the telephone.

For example, IVR systems are used to implement services that supply audio information to users via the PSTN. In general, a user dials a telephone number associated with a selected IVR information service to listen to audio information directed to a subject of interest to the user. The IVR information service responds to the call by offering a voice menu of information selections. The user selects the desired information item by pressing one or more predetermined buttons on the telephone dial pad. However, IVR information services often lead users through a daunting number of instructions and dial pad presses before the caller receives the desired audio information. When listening to an extended set of instructions, a caller is often faced with writing notes to memorialize the instruction set prior to responding to the instructions to obtain the desired information. Accordingly, IVR information services can be difficult for a caller to effectively use because the caller typically must remember and correctly respond to a set of instructions prior to hearing the desired information.

In recognition of this disadvantage of present audio-based communications services, the telecommunications industry has developed a system that supplements the audio information supplied from voice-based communications services by transmitting data over the telephone line for presentation by a visual display located on a specially adapted telephone. The system is implemented by using an analog telephone line instead of an ISDN telephone line because an ISDN telephone line is at present less cost-effective than an analog line. By supplying both audio and visual information over the analog telephone line, the system provides added value to communication services offered via the PSTN, promotes increased telephone usage, and defines a transition path for the eventual use of ISDN technology for such data display applications.

A prior art system transmits data to an ADSI-compatible telephone using a bi-directional communications protocol based upon dual tone multiple frequency (DTMF) and BELL 202 modem signaling. A call placed to a preselected telephone number associated with a service is routed through the end office to a service switching point, specifically a Northern Telecom Model DMS-100. In response to the call, the service switching point transmits data and instructions to the ADSI-compatible telephone. The data generally includes textual information associated with the selected service and softkey labels corresponding to softkeys on the ADSI-compatible telephone, and instructions for the ADSI-compatible telephone. An initial instruction is transmitted as a DTMF signal and textual information, softkey labels, and subsequent instructions are transmitted as BELL 202-compatible modem signals. When the user presses a softkey, the ADSI-compatible telephone initiates a resident action or transmits a DTMF signal assigned to the softkey and the system responds by updating the data presented by the display of the ADSI-compatible telephone. This information update is completed by downloading responsive textual information and softkey labels to the ADSI-compatible telephone. The service is terminated when the user returns the telephone handset to an on-hook position.

A critical limitation of the prior art system is that the implementation for the ADSI communications service is constrained by the capabilities of the equipment installed for a typical telephone network including the end office and the service switching point. This equipment is generally designed for general purpose telephone-related applications and often does not facilitate the rapid and efficient implementation of a specific ADSI service by a service provider.

Accordingly, there is a need for a system that is capable of supplying data for visual display by an ADSI-compatible telephone and can be quickly installed by a service provider within the framework of an existing public switched telephone network. In particular, there is a need for an ADSI system that is implemented by connecting a service circuit node, which is programmable by the service provider for a specific ADSI service, to an existing service switching point. The present invention uses a service circuit node and an adjunct processor having BELL 202 modem and DTMF signaling functions to implement a communications service for displaying textual information via the PSTN.

SUMMARY OF THE INVENTION

The principles of the present invention solve the problem faced by service providers of rapidly and efficiently installing an ADSI communications service within an existing PSTN. In particular, the present invention is implemented without modifying equipment of the existing telephone network. Instead, the present invention uses a service circuit node that is specifically adapted for the particular ADSI service supplied by the service provider. This service circuit node is added to an existing telephone network by connecting the node to an available service switching point. This installation is transparent to a user of the telephone network.

Stated generally, the present invention is a system for communicating with an ADSI-compatible telephone via a telephone line of a public switched telephone network. The present invention includes a service circuit node, connected to the communications port of a service switching point, for generating information signals containing textual information and instructions. An adjunct processor, connected to the service circuit node and removably connected to the telephone line, processes the information signals by modulating a carrier in accordance with the digital information signals to supply information data for transmission over the telephone line to the ADSI-compatible telephone. A visual display connected to an ADSI-compatible telephone displays the textual information in response to the information data.

An ADSI service is selected by a calling party. In response to a service selection signal output by the ADSI-compatible telephone, the service circuit node initiates the selected service by outputting the information signals to the adjunct processor and connecting the adjunct processor to the telephone line. After processing the information signals, the adjunct processor outputs the resulting information data for transmission over the telephone line. Alternatively, in response to a service disconnect signal output by the ADSI-compatible telephone, the service circuit node disconnects the adjunct processor from the telephone line and thereby terminates the ADSI service.

More particularly described, to initiate reception of a selected ADSI-service, a caller calls a predefined telephone number. This telephone number is recognized as a service selection signal by the service circuit node. In response to the service selection signal, the service circuit node selects and activates a service program operating on the service circuit node and corresponding to the service selected by the caller. The service program generates a message including information signals, which typically contain textual information and telephone instructions, for the service selected by the user. The message further includes an initial instruction that instructs the telephone to switch from the default voice mode to the data mode for the duration of the data transmission. The service program also issues a request for the service circuit node to connect the telephone line to the adjunct processor and sends the message to the adjunct processor. In response, the adjunct processor converts the digital initial instruction to supply initial instruction data having an analog format for transmission over the telephone line. The adjunct processor also modulates a carrier in accordance with the digital information signals and transmits the resulting information data over the telephone line. The telephone enters the data mode and the visual display of the ADSI-compatible telephone displays the textual information. The ADSI-compatible telephone also can enter a voice mode to supply audio information to the caller, thereby enabling a service provider to offer an ADSI service that supplies interleaved textual information and audio information to the caller.

To receive an additional portion of textual information during reception of the service, the user presses a selected button on the ADSI-compatible telephone, typically a softkey corresponding to a softkey label displayed by the visual display. In response to the selected softkey, the ADSI-compatible telephone transmits a command signal over the telephone line. The adjunct processor converts the analog command signal to digital command data and supplies the command data to the service circuit node. In response, the selected service program generates selected information signals, typically containing certain textual information and certain telephone instructions, and sends the selected information signals to the adjunct processor. The adjunct processor thereafter processes the selected information signals by modulating a carrier with the selected information signals to generate selected information data for transmission over the telephone line. The visual display subsequently updates its display by displaying the certain textual information. The caller terminates the service by placing the telephone handset on hook, thereby transmitting a service disconnect signal over the telephone line to the system.

The service circuit node includes a control computer for running at least one service program that generates the information signals. The service circuit node further includes a switching network, connected to the control computer via a local area network (LAN), for removably connecting the adjunct processor to the telephone line. A base program operating on the control computer controls the switching operations conducted by the switching network and allocates the resources of the adjunct processor.

The adjunct processor includes a modulator/demodulator (modem) that modulates a carrier with the information signals to supply information data for transmission over the telephone line. The information data typically contains decoded data including display information, softkey labels, softkey definitions, and telephone instructions.

The adjunct processor further includes a DTMF tone processor that converts the digital initial instruction to supply initial instruction data having an analog format for transmission over the telephone line. The DTMF tone processor also converts the analog command signal output by the ADSI-compatible telephone to supply digital command data to the service circuit node. The initial instruction data and the command signal are formatted as DTMF tones, while the initial instruction and the command data are formatted as digital signals. The information data are formatted as BELL 202 analog signals.

A computer, connected to the modem and to the DTMF tone processor, controls the respective modulation and signaling operations of the modem and the DTMF tone processor. The computer is also connected to the LAN for two-way communication with the control computer.

Therefore, it is an object of the present invention to provide a system for communicating data with an ADSI-compatible telephone.

It is a further object of the present invention to provide a system, for communicating data with an ADSI-compatible telephone, which can be rapidly and efficiently installed within an existing PSTN by an ADSI service provider.

It is a further object of the present invention to provide a system, for communicating data with an ADSI-compatible telephone, which connects to a communications port of an existing service switching point of a public switched telephone network.

It is a further object of the present invention to provide a system for communicating data with an ADSI-compatible telephone by connecting a service circuit node having an adjunct processor capable of modem and DTMF signaling to an existing service switching point of a public switched telephone network.

It is a further object of the present invention to provide a system, for communicating data with an ADSI-compatible telephone, which interleaves voice and textual information to supply a communications service to the ADSI-compatible telephone.

BRIEF DESCRIPTION OF THE DRAWINGS

FIG. 13 is an illustration of a typical "Welcome" menu 0 for a movie hotline service.

FIG. 14 is an illustration of a typical "Cinemas" menu 1 for the movie hotline service.

FIG. 15 is an illustration of a typical "Choices" menu 2 for the movie hotline service.

FIG. 16 is an illustration of a typical "Movies at Cinema X" menu 3 for the movie hotline service.

FIG. 17 is an illustration of a typical "Directions" menu 4 for the movie hotline service.

FIG. 18 is an illustration of a typical "Prices" menu 5 for the movie hotline service.

FIG. 19 is an illustration of a typical "Times" menu 6 for the movie hotline service.

FIG. 20 is an illustration of a typical "Date" menu 7 for the movie hotline service.

FIG. 21 is an illustration of a typical "Movie List" menu 10 for the movie hotline service.

FIG. 22 is an illustration of a typical "Sub-Cinemas" menu 11 for the movie hotline service.

FIG. 23 is an illustration of a typical "Time" menu 12 for the movie hotline service.

FIG. 24 is an illustration of a typical "Number of Tickets" menu 13 for the movie hotline service.

FIG. 25 is an illustration of a typical "Total" menu 14 for the movie hotline service.

FIG. 26 is an illustration of a typical "Card Number" menu 15 for the movie hotline service.

FIG. 27 is an illustration of a typical "Expiration Date" menu 16 for the movie hotline service.

FIG. 28 is an illustration of a typical "Pickup" menu 17 for the movie hotline service.

FIG. 29 is an illustration of a typical "Movie Search" menu 18 for the movie hotline service.

DETAILED DESCRIPTION OF THE PREFERRED EMBODIMENT

Figure 1:
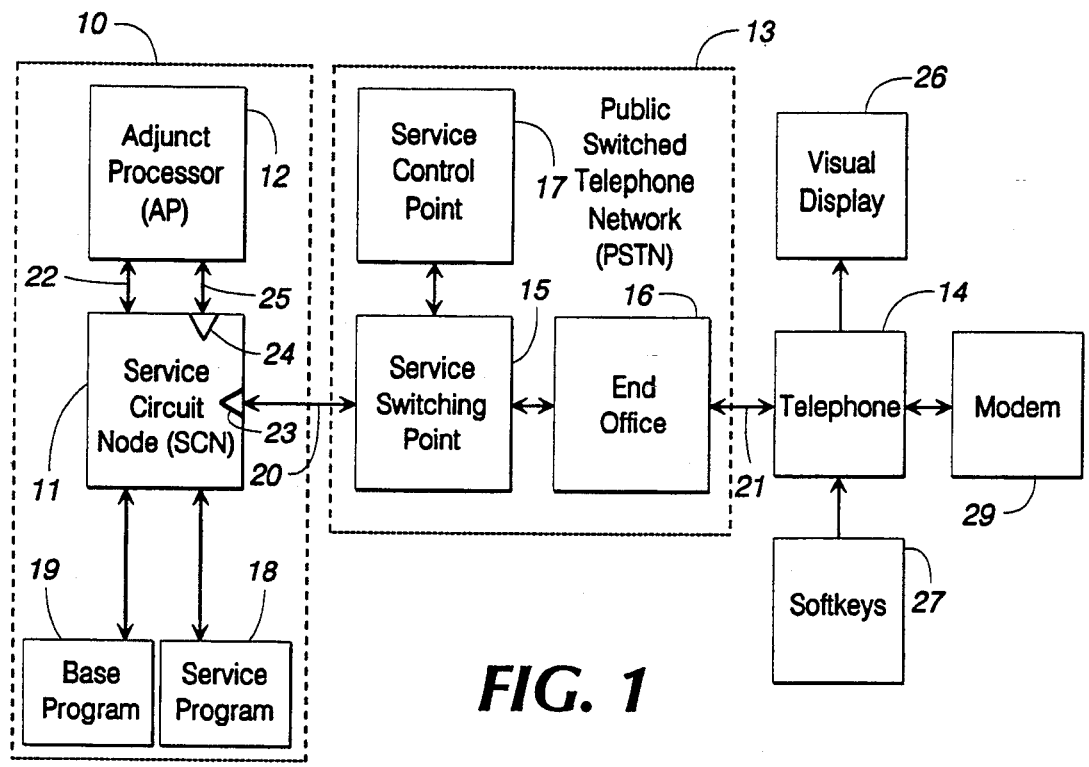
FIG. 1 is a block diagram of the operating environment for the present invention.

Referring now to the drawings, in which like numerals indicate like elements throughout the several figures, FIG. 1 is a block diagram illustrating the preferred environment of the present invention, which includes an apparatus and a method for a telephone display system 10. Stated generally, an embodiment of the present invention provides communications services to a calling party by downloading data, including textual information and softkey functions, via a PSTN to a telecommunications device having a visual display for presenting the textual information. A service provider can download one or more virtual pages of display information and accompanying softkey function definitions, and then interact with the user through information choices made with the defined softkeys. The calling party can update the displayed textual information by selecting a softkey on the device that is associated with the desired information update. The present invention also can update the displayed textual information without the caller pressing a softkey by presenting predetermined textual information, such as a failure message, to the caller upon the expiration of a time-out period. Accordingly, the present invention supplies a novel combination of voice and textual data to a calling party via a conventional analog telephone line by routing such information from a service circuit node to the device via the PSTN.

The telephone display system 10 preferably operates with a specially adapted telephone equipped with a visual display and one or more softkeys for communication via a programmable switching mechanism connected to the PSTN. One such telephone is an Analog Display Services Interface (ADSI)-compatible telephone. By calling a selected communications service offered by the system 10, the caller is presented with a series of menus and a set of function defining labels for softkeys that are useful for navigating through the displayed menus and for the selection of menu items. A softkey is a button or key, typically located on the face of the telephone and adjacent to the display, which has a programmable or user definable function. For the preferred embodiment, the function of the softkey is defined by the selected communications service and associated with the specific menu items presented by the visual display. Each function is identified by a softkey label that is typically displayed within that portion of the visual display adjacent to the associated softkey. By reviewing the information presented by the visual display and pressing one or more selected softkeys (and scroll keys), the system 10 can lead a caller through a sequence of actions to retrieve desired information or to implement instructions associated with the selected communications service. This reduces or eliminates the need for a user to memorize steps as is often required by audio communications services.

The communications services supplied by the system 10 can generally be divided into two categories: (1) information services and (2) control services. An example of an information service is a movie hotline service that supplies a caller with textual information concerning movies playing at local cinemas. Upon the caller selecting the movie hotline service by dialing a telephone number for that service, the system 10 downloads movie hotline-related data to the specially adapted telephone for presentation to the caller by the visual display. By selecting various softkeys and viewing presented menus, the caller can then search through a list of cinemas and review the movies playing at each cinema. Alternatively, a caller can search through a list of movies and then see the cinemas that are showing a given movie. The caller also can access such movie-related information as movie descriptions, movie times, and travel directions to a selected local cinema. Those skilled in the art will appreciate that information services implemented at present by audio-based communications services also can be implemented as text-based services or mixed voice/text-based services for use with the disclosed system 10.

An example of a control service that can be supplied by the system 10 is a service that guides a user through the administration and control of Advanced Intelligence Network (AIN) services offered at present by telecommunications services providers. For example, upon dialing the telephone number associated with a typical AIN service, such as the personal number service, the user is presented with a set of menus and softkey labels on the visual display that permit the user to perform administrative tasks associated with the service. The use of a combination of softkeys and/or buttons on the telephone dial pad permit the user to complete the following tasks: toggle service features on and off, change personal identification number (PIN) numbers, enter telephone numbers and textual information, register at various locations, and edit complex structures such as speed dial lists, call screening lists, or time of day/week routing schedules.

Another example of a control service is the use of the disclosed system to manage a typical voice mail system, which is a service that records telephone messages for a particular service subscriber. This voice mail management system allows a user to view information concerning all incoming calls and to know whether or not a message has been left by a specific incoming caller. Menus and visual softkey prompts instruct the user about available voice mail management operations when the user is reviewing messages, sending messages, deleting an entry from the voice mail log, or changing administrative options, such as a greeting or a password. The user also can listen to the recorded messages in any order by selecting a softkey corresponding to each recorded message. By pressing a softkey associated with a dialing function, the user can place a call to any caller that appears as a mail log entry and for which a calling party number is available.

Other examples of ADSI control-type services include banking services and the administration of custom calling services, such as call waiting or call return.

As shown in FIG. 1, the system 10, which comprises a service circuit node 11 and an adjunct processor 12, preferably operates with a PSTN 13 to deliver data containing textual information to a party calling from a telephone 14. The PSTN 13 is a conventional telephone network comprising a service switching point 15 connected to an end office 16 and to a service control point 17. The system 10 connects to the PSTN 13 via a standard interconnect facility 20, such as ISDN lines, suitable for digital voice and data transmissions. In contrast, the telephone 14 is connected to the PSTN 13 via a conventional analog telephone line 21. Although the system 10 preferably operates in connection with one or more end offices and/or tandem offices, such as the end office 16, the system 10 also can be configured to operate with other telecommunications switching mechanisms, including a private branch exchange (PBX). In addition, it will be appreciated that a plurality of telephones, such as the telephone 14, will normally be connected to the PSTN 13 for communication with the system 10.

Stated generally, a calling party selects a communications service offered by the system 10, and dials a telephone number associated with the selected communications service. The system 10 receives the service selection signal via the PSTN 13. The service selection signal is preferably output over the telephone line 21 from the telephone 14. The end office 16 and the service switching point 15 direct the call to the service circuit node 11. In response to the service selection signal, a selected service program 18 residing on the service circuit node 11 becomes active and begins to execute preferred program steps. Those preferred program steps are described below with respect to FIGS. 5–10. Accordingly, the receipt of the service selection signal at the service selection node 11 initiates the administration of the selected communications service. If more than one service program resides on the service circuit node 11, then each service program is assigned a unique identifier associated with a telephone number.

The service program 18 includes one or more software programs, primarily written as high level call processing routines, which implements a communications service for downloading data to the telephone 14 for visual presentation to the calling party. The preferred language is the Service Logic Language (SLL) supplied by AT&T Network Systems, Chicago, Ill. The service program 18 sends information signals from the service circuit node 11 to the adjunct processor 12 via a network 22, preferably a local area network (LAN) such as an Ethernet network. The information signals contain textual information associated with the selected communications service, typically comprising menus and softkey labels, softkey function definitions, and telephone instructions. The telephone instructions contain commands for controlling certain operations of the telephone 14. To place the telephone 14 in the proper operating mode to receive data, the service program 18 preferably sends an initial instruction from the service circuit node 11 to the adjunct processor 12 via the network 12. The initial instruction contains a command that instructs the telephone 14 to enter a data mode to properly receive the data communicated by the system 10.

A base program 19, which also runs on the service circuit node 11 and is preferably implemented as one or more UNIX routines, manages the switching operations conducted by the service circuit node 11 and the allocation of the processing resources of the adjunct processor 12. In response to the service selection signal, the service program 18 requests the base program 19 to issue instructions that direct the service circuit node 11 to connect the adjunct processor 12 to the incoming call carried by the telephone line 21. The base program 19 is preferably capable of operating with one or more of the service programs 18.

The service circuit node 11 includes a first set of switch node ports 23 connected to the ISDN lines of the interconnect facility 20 and a second set of switch node ports 24 connected via conductors 25 to the adjunct processor 11. In response to the request by the service program 18, the base program 19 instructs the service circuit node 11 to implement a signal path between the incoming call and the adjunct processor 12 by connecting a selected first switch node port 23 associated with the incoming call to a selected second switch node port 24 designated for communication with the adjunct processor 12. This signal path remains in place while the system 10 communicates with the telephone 14.

Figure 12:
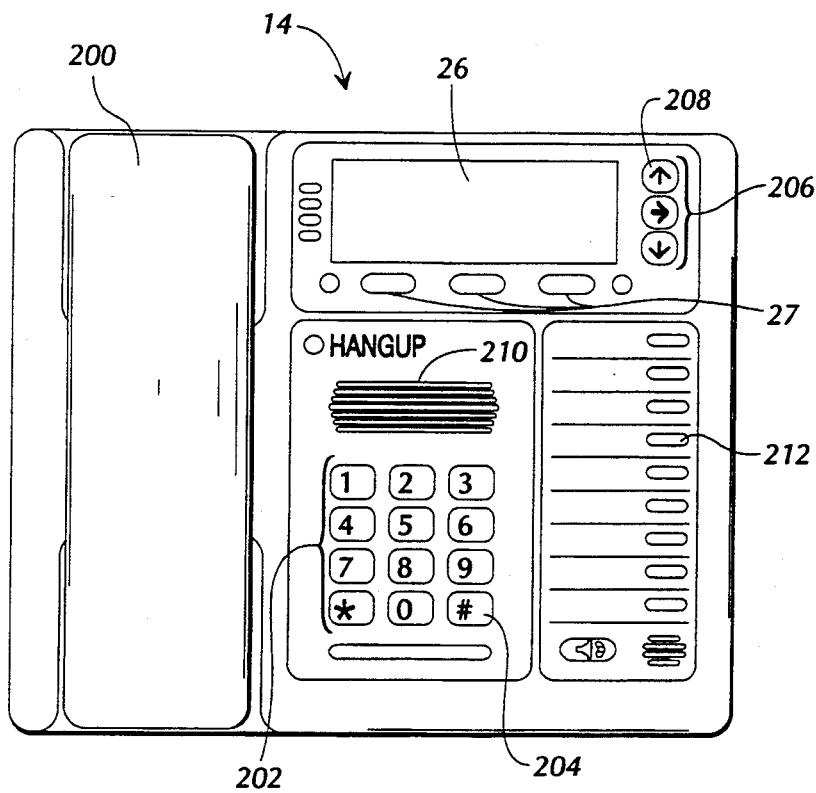
FIG. 12 is a diagram showing a top view of the face of a typical ADSI-compatible telephone.

In response to the information signals, the adjunct processor 12 modulates a carrier in accordance with the information signals to supply instruction data for transmission over the telephone line 21. In response to the initial instruction, the adjunct processor 12 also converts the digital format of the initial instruction to supply initial instruction data having an analog format (DTMF) for transmission over the telephone line 21. During reception of the program service, the information data are stored within one or more pages of addressable display memory (not shown) in the telephone 14. Referring briefly to FIG. 12, upon reception of the information data, the telephone 14 displays the textual information on a visual display 26 connected to the telephone 14 and implements the functions for one or more softkeys 27 corresponding to the softkey labels that are typically presented as at least a portion of the displayed textual information. The buttons or keys for the softkeys 27 are preferably located on the face of the telephone 14 and adjacent to the display 26 so as to conveniently present the softkey labels near the associated softkeys.

The user interacts with the communications service by selecting one or more softkeys 27. The softkeys 27 have defined functions that are preferably downloaded in connection with the display commands. The calling party preferably reviews the displayed information and thereafter pushes one of the defined softkeys 27. In response, the telephone 14 generates a command signal associated with the selected softkey. A DTMF sequence corresponding to the command signal is then transmitted back to the system 10 over the telephone line 21 in response to the calling party pressing the softkey 27.

Referring again to FIG. 1, the PSTN 13 relays the command signal to the service circuit node 11, specifically to the selected first switch node port 23, because the signal path between the telephone 14 and the service circuit node 11 is maintained by the PSTN during the communications service. The command signal is then output from the selected second switch node port 24 to the adjunct processor 12 via conductor 25. The adjunct processor 12 converts the DTMF sequence of the command signal to a digital format and outputs the resulting command data to the control computer 30 (FIG. 2) of the service circuit node 11 via the network 22.

The base program 19 relays the command data to the service program 18. In response, the service program 18 instructs the service circuit node 11 to output to the adjunct processor 12 selected information signals containing certain textual information and certain telephone instructions that are responsive to the selected softkey 27. The adjunct processor 12 then modulates a carrier in accordance with the selected information signals to produce selected information data. The selected information data are then passed via the conductor 25 to the service circuit node 11, which subsequently outputs the selected analog format data via the PSTN 13 for transmission over the telephone line 11. In response to the reception of the selected information data, the telephone 14 updates the textual information displayed by the visual display 26.

The service circuit node 11 is preferably the BellSouth services node. Information concerning the BellSouth services node is available from BellSouth Corporation, Atlanta, Ga. Service circuit nodes, such as the BellSouth services node, are available from AT&T Network Systems, Chicago, Ill. The functions of the preferred BellSouth services node are programmable by the service provider and at least one of the communications service programs 18 and the base program 19 reside on the node.

The telephone 14 can be a telecommunications device that complies with the ADSI protocol as defined by the Bell Communications Research Special Report entitled "Customer Premises Equipment Compatibility Considerations For The Analog Display Services Interface," SR-INS-002461, October 1992, and a companion Bell Communications Research Technical Report entitled "Generic Requirements For An SPCS To Customer Premises Equipment Data Interface For Analog Display Services," TR-NWT-001273, December 1992. The contents of both documents are hereby incorporated by reference. The telephone 14 also can be a telecommunications device that complies with the specification for Sesame customer premises equipment (CPE) as defined by Northern Telecom in "Sesame Network/CPE Interface Specification," TR91-40001, Apr. 22, 1991, incorporated herein by reference. For the preferred embodiment, the telephone 14 is the Sesame CPE, which is capable of receiving both voice and data signals from the system 10 and includes two or more addressable pages of memory for accepting downloaded data to support display applications. It will be appreciated that the system 10 can operate with either or both of the telecommunications devices defined by the above Bell Communications Research specifications and the Northern Telecom Sesame specification. The telephone 14 is connected to a receive-only modem 29 for receiving the modem signals from the adjunct processor 12.

Figure 2:
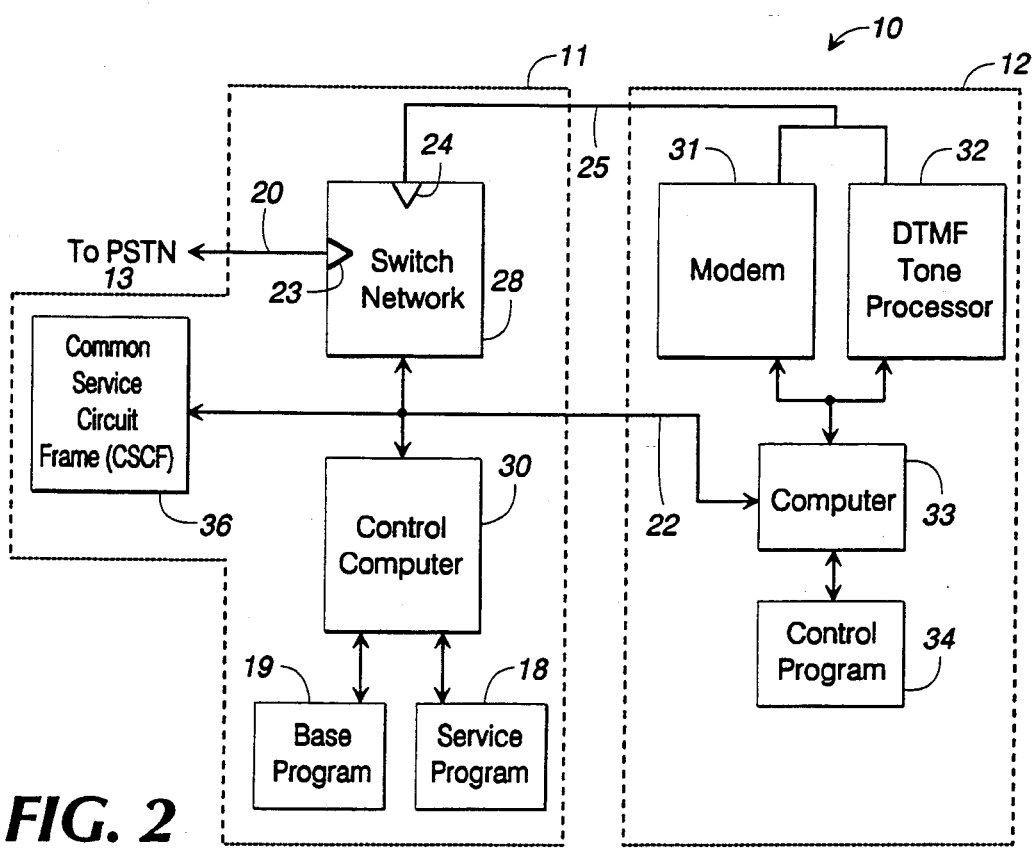
FIG. 2 is a block diagram of the preferred embodiment of the present invention.

FIG. 2 shows a block diagram of the preferred embodiment of the present invention. Referring to FIG. 2, the service circuit node 11 comprises a switch network 28, otherwise referred to as a switch fabric, a control computer 30, and a common service circuit frame 36. The service program 18 and the base program 19 are both executed by the control computer 30 and communicate through standard UNIX Inter Process Communication (IPC) message queues. The control computer 30 is preferably a model Star Server FT 3000 manufactured by Tandem, located in San Jose, Calif.

For a typical communication between the program 18 and 19, the service program 18 issues information signals, otherwise referred to as service commands, which will be downloaded as a message to the telephone 14 for presentation by the visual display 26. The service program 18 notifies the base program 19 that a service command, which typically includes textual information and telephone instructions, is pending by placing a message in the message queue. The base program 19 continuously checks the message queue. When a message arrives, the base program 19 relays the message to the adjunct processor 12 by sending a datagram message via the network 22 to the network address of the processor 12. Likewise, the adjunct processor 12 communicates with the base program 19 by relaying a message via the network 22 to the network address of the service circuit node 11.

Typical service commands include: load softkey; initialize softkey; load telephone display; information; line control; disconnect; switch to data; switch to voice; cursor control; and move data.

The various data types associated with the service commands include: softkey labels; softkey responses; textual information for loading into the display memory in the telephone 14; format code for the telephone 14; a data string used to specify which direction to move data in the telephone display memory; a data string used to specify which direction to fill the display 26 when collecting data entered by the user at the telephone 14 via a dial pad; a data string used to specify which predefined template to use when filling the display with data entered by the user at the telephone 14 via the dial pad; and a data string used to specify the display characteristics of the telephone 14.

Typical telephone instructions include the following softkey definitions: open switch hook; close switch hook; flash switch hook; wait for detection of dial tone; return the current line number using DTMF tones; send the characters or digits that have been entered by the caller; clear the characters or digits that have been entered by the caller; erase the last character that was collected; go to a specific page and line number in telephone display memory; move one line up in the display; and move one line down in the display. Many of these softkey definitions permit a caller to update the information presented by the display 26 without requesting additional information from the service circuit node 11 by the caller pressing an appropriate softkey 27 that initiates a resident action defined by those softkey definitions.

Service commands are preferably grouped into one download group or message prior to downloading the service commands to the telephone 14 to thereby reduce the signaling overhead. A service session typically comprises 50 to 100 service commands. Accordingly, the service commands are buffered until all of the commands are assembled for the service session, and then the group of service commands is sent to the telephone 14.

The switching network 28 includes two sets of switch node ports: the first set of switch node ports 23 connected to the PSTN 13 by the ISDN lines 20, and the second set of switch node ports 24 connected to the adjunct processor 12 by the conductors 25. In response to the service selection signal, the selected service program 18 requests that the base program 19 implement a signal path between the incoming call and the adjunct processor 12 via the switching network 28. The base program 19 subsequently instructs the switching network 28 to connect a selected first switch node port 23 to a selected second switch node port 24 to complete the signal path between the adjunct processor 12 and the telephone 14. This instruction is carried from the control computer 30 to the switching network 28 by the network 22, which supplies a two-way communications link between the switching network 28 and the control computer 30.

During reception of the selected communications service by the telephone 14, the PSTN 13 maintains a signal path between one of the ISDN lines 20 and the telephone line 21 of the calling party. In turn, the switching network 28 maintains a signal path between the selected ISDN line 20 and a selected conductor 25, preferably an analog line, connected between the selected second switch node port 24 and the adjunct processor 12. This extended signal path permits the telephone 14 to receive the information data from the adjunct processor 12 and to transmit the command signal, which typically contains a request for updated information, to the adjunct processor 12.

When the calling party terminates the communication service by placing the telephone 14 on hook, the PSTN 13 routes a service disconnect signal to the system 10. The service program 18 responds to the receive disconnect signal by requesting the base program 19 to terminate the signal path connection. The switching network 28 breaks the signal path connection in response to an instruction from the base program 19, which issues the instruction in response to the request by the service program 18. The switching network 28 disconnects the selected first switch node port 23 from the selected second switch node port 24, thereby breaking the extended signal path between the telephone 14 and the system 10.

The common service circuit frame 36 is connected to the switching network 28, the control computer 30, and the computer 33 via the network 22. The common service circuit frame 36 supplies related telecommunications capabilities, such as a text-to-voice capability, a facsimile capability, or a voice playback and recording capability, to support the ADSI communications services. It will be appreciated that the capabilities provided by the common service circuit frame 36 can be utilized to support one or more ADSI communications services.

The adjunct processor 12 comprises a conventional modulator/demodulator (modem) 31, a DTMF tone processor 32, and a computer 33. The modem 31 and the DTMF tone processor 32 are connected to the analog line 25. The computer 33 is connected to both the modem 31 and the DTMF tone processor 32, and controls their respective transmission and signaling operations. The computer 33 is also connected to the switching network 28 and to the control computer 30 via the network 22. A control program 34 runs on the computer 33 to manage the operations of the modem 31 and the DTMF tone processor 32.

For the ADSI communications service, the modem 31 receives information signals output from the computer 30 via the computer 33 and the network 22. The information signals are digital signals and the modem 31 modulates a carrier in accordance with the digital signals. This modulation operation produces the information data in an analog signal format for transmission via the PSTN 13 to the telephone 14. The modem 31 is only used because the preferred BellSouth services node does not presently perform modem functions without modification.

The DTMF tone processor 32 likewise receives the initial instruction output from the control computer 30 to the computer 33 via the network 22. Processor 32 converts the digital initial instruction into a DTMF tone sequence to produce initial instruction data. Again, the DTMF tone processor 32 is only necessary because the preferred BellSouth services node supports at present only limited DTMF signaling. The DTMF tones output by the processor 32 serves as an instruction that prepares the telephone 14 to receive the communication of the selected service by instructing the telephone 14 to enter the data mode. The DTMF tone processor 32 preferably outputs the initial instruction data to "wake-up" the telephone 14 to accept the downloaded data associated with the selected service.

The information data are passed by the modem 31 via the conductor 25 to the switching network 28 and thereafter routed to the telephone line 21 via the PSTN 13. The information data are downloaded into the memory of the telephone 14 and the textual information contained in the information data are presented to the caller by the visual display 26.

The DTMF tone processor 32 also converts the DTMF tones output as a command signal from the telephone 14 into digital command data signals. The command signals, which may contain a request by the telephone 14 for an information update, are converted by the processor 32 and forwarded to the computer 32 for eventual processing by the computer 30. The computer 33 outputs the command data via the network 22 to the computer 30 for processing by the programs 18 and 19. Other command signals contain a message acknowledgment or data entered by the caller in response to a visual prompt presented by the display 26.

For the preferred embodiment, the modem 31 is a BELL 202-compatible modem. The modem 31 is typically a modem having both receive and transmit capabilities. The DTMF tone processor 32 is implemented as two voice processing boards, each a model D41/D manufactured by Dialogics Corporation, located in Parsippany, N.J. The model D41/D supports four independent analog signal channels. The computer 33 is a general purpose personal computer system, such as a personal computer using a model 80386 or 80486 microprocessor, having a serial interface and expansion slots or an equivalent external interface (not shown) for connecting peripheral cards to the bus of the computer. For the preferred embodiment, the computer 33 is a rack mounted, 48 volt, NEBS-compatible personal computer system using a model 80486 microprocessor. UNIX V version 4.04 preferably runs on the computer 33.

Figure 3:
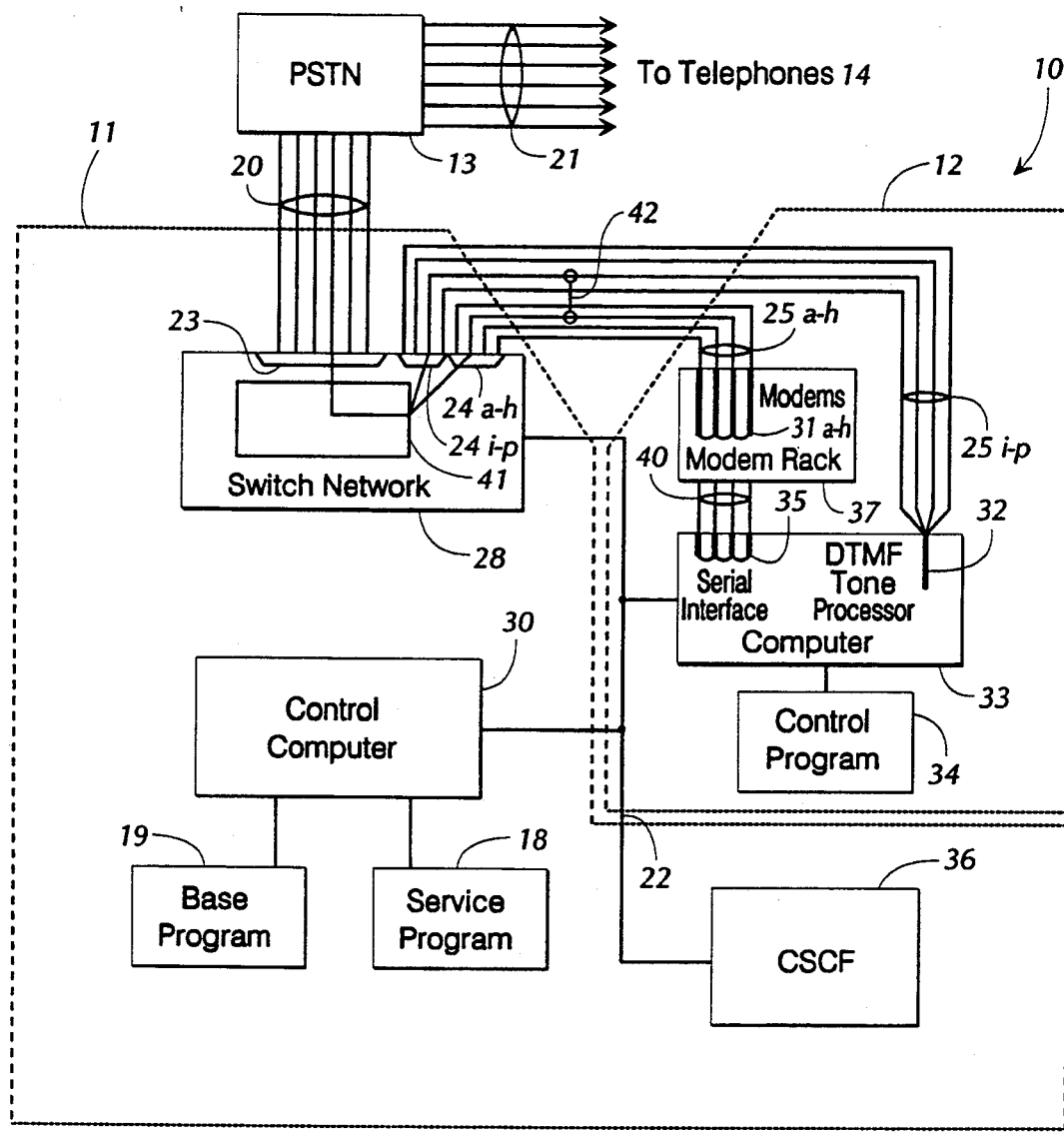
FIG. 3 is a block diagram of the preferred switching network for the present invention.

FIG. 3 shows a more detailed view of the switching network 28 and its interface with the PSTN 13 and the adjunct processor 12. The modem 31 is preferably implemented as a modem rack 37 containing eight individual BELL 202-compatible modem devices 31 a–h, such as a model UDS 202 S/T model manufactured by Universal Data Systems, located in Huntsville, Ala. To efficiently place the ADSI capability on the service circuit node 11, a pool of modems, such as the modems 31 a–h, is preferably available on an as needed basis. The BELL 202-compatible modem 31 is connected to the computer 33 as an external peripheral device because this type of modem is not readily available for installation within an expansion slot of the preferred computer 33. Each of the BELL 202-compatible modems 31 a–h is connected to a serial interface 35 of the computer 33 via a serial line 40. The serial interface 35 is preferably a multi-port expander board that connects to an expansion slot of a general purpose computer, such as the computer 33, and is manufactured as a model Digi Channel PC/8 by DigiBoard in St. Louis Park, Minn. The model PC/8 adds eight RS-232 serial ports to the preferred computer 33. The BELL 202-compatible modems 31 a–h also are connected via analog lines 25 a–h to the second set of switch node ports 24 a–h.

The preferred DTMF tone processor 32 comprises two boards intended for installation within expansion slots of the computer 33. The eight independent analog channels supplied by the two boards are connected to the second set of switch node ports 24 i–p by the analog lines 25 i–p. For the preferred embodiment, the switching network 28 connects one of each of the groups of analog lines 25 a–h and 25 i–p to the particular ISDN line 20 carrying the incoming call to allow the system 10 to communicate with the telephone 14. This connection is completed by a three port conference circuit 41, which is a well known switching mechanism. The switching network 28 includes a plurality of three port conference circuits, such as the circuit 41.

Figure 4:
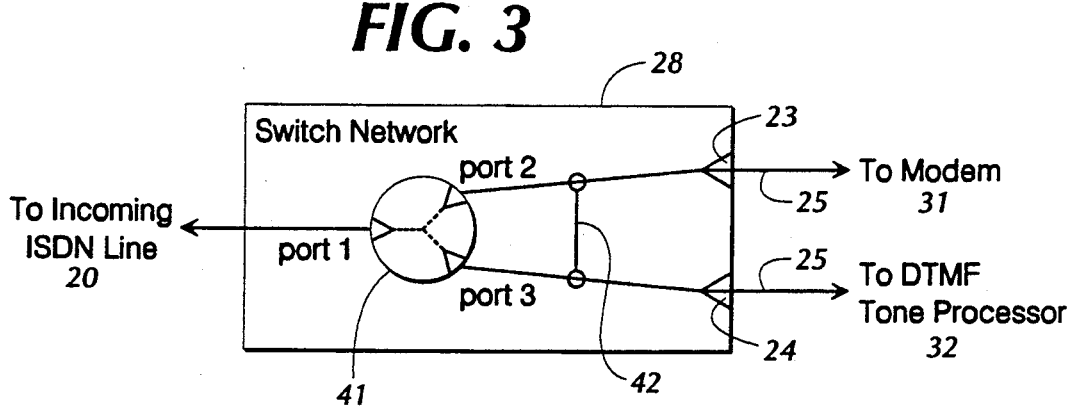
FIG. 4 is a block diagram that illustrates the allocated ports for a three-way conference circuit.

FIG. 4 is a block diagram that provides a detailed view of the configuration of the ports for the three port conference circuit 41. Referring to FIGS. 3 and 4, the base program 19 issues instructions to initialize the multiple-channel resources of the adjunct processor 12, specifically each of the modems 31 a–h in the modem rack 37 and the eight analog channels of the DTMF tone processor 32, during the start-up of the system 10. During the initialization process, the base program 19 allocates the three way conference circuits 41 having ports 1, 2, and 3 for connection to each of the analog lines 25 a–h connected to the modems 31 a–h and to each of the analog lines 25 i–p connected to the analog channels of the DTMF tone processor 32. The modems 31 a–h and each of the analog channels of the DTMF tone processor 32 are activated in response to initialization instructions from the base program 19.

Focusing upon one of the allocated three way conference circuits 41, which includes ports 1, 2, and 3, the base program 19 connects a selected one of the analog lines 25 a–h to port 2 and a selected one of the analog lines 25 i–p to port 3. This connection of one of the modems 31 a–h and one of the analog channels of the DTMF tone processor 32 by the three way conference circuit 41 forms a communications channel 42. The communications channel 42 is a signal path to the selected modem and to the selected analog channel. For the preferred embodiment, eight separate communications channels are formed during the initialization operation. The port 1 remains open until an incoming call carried by one of the ISDN lines 20 is connected to that port by the switching network 28.

It will be appreciated that the separate devices used at present to provide the functions of the modem 31 and the DTMF tone processor 32 can be replaced by two four channel voice processor boards having both DTMF and modem signaling functions and, in combination, suppling eight channels. The substitution of a board having both DTMF and modem signaling functions for the present separate devices of the modem 31 and the DTMF tone processor 32 would permit the more efficient use of a two port switching mechanism to connect the system 10 to the incoming call supplied by the ISDN line 20.

The flow charts in FIGS. 5–10 provide a detailed description of the process steps executed by the system 10. The steps are largely performed by, or at the instruction of, various software programs, including the service program 18 and the base program 19 residing on the service circuit node 11, and a control program 34 residing on the adjunct processor 12. Using an analogy to electrical circuit diagrams, these flow charts are equivalent to a detailed schematic for an electrical circuit where the provision of the circuitry for electrical circuit blocks corresponds to the provision of actual computer instructions for blocks of the flow chart. The coding of the process steps of these flow diagrams into instructions for suitable commercially available computers is a mere mechanical step for an engineer or other person skilled in the programming arts.

Figure 5:
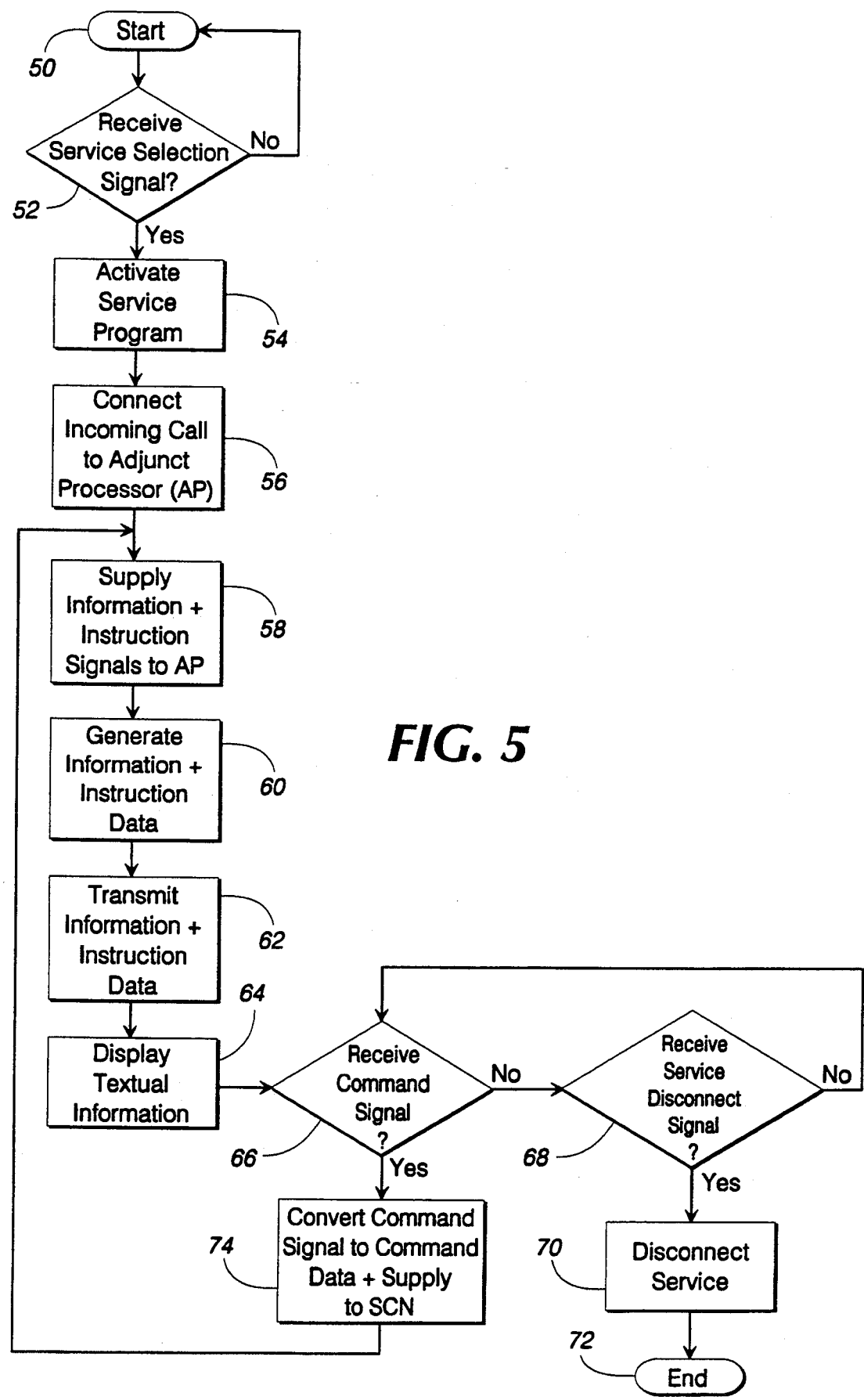
FIG. 5 is a flow chart that illustrates the preferred steps conducted by the present invention for transferring data to an ADSI-compatible telephone.

FIG. 5 is a flow chart diagram illustrating the steps of a method for communicating data to an ADSI-compatible telephone via a service circuit node. Referring now to FIG. 3 for the components and to FIG. 5 for the process, the process is entered at step 50, and in step 52, the service circuit node 11 inquires as to whether a service selection signal has been received from the telephone 14 via the PSTN 13. If the service circuit node 11 has not received the service selection signal, the No branch is followed back to the step 50 and the process is begun again. However, if the service selection signal is present at the service circuit node 11, the Yes branch is followed to step 54. In the step 54, a selected service program 18 corresponding to the communications service assigned to that selection service signal is activated and begins to execute program code.

In step 56, the service circuit node 11 connects the adjunct processor 12, specifically the modem 31 and the DTMF tone processor 32, via one of the communications channels 42 to the incoming call by a selected three way conference circuit 41. The service circuit node 11 implements this connection in response to an instruction by the base program 19, which issues the instruction in response to a request from the service program 18.

In step 58, the service program 18 generates the information signals, including the initial instruction, and instructs the service circuit node 11 to supply those signals to the adjunct processor 12. The information signals, typically including textual information, softkey definitions, and telephone instructions, are forwarded from the service program 18 to the adjunct processor 12 by the base program 19. In step 60, the modem 31 modulates a carrier in accordance with the information signals to produce information data for transmission to the telephone 14. Furthermore, the DTMF tone processor 32 converts the digital initial instruction to produce a DTMF sequence of initial instruction data for transmission to the telephone 14. The DTMF tone sequence places the telephone 14 in the proper mode to receive the data. The telephone 14 will return to the default voice mode at the conclusion of the data transmission.

The adjunct processor 12 outputs the information data and the initial instruction data via the switching network 28 to the ISDN line 20 carrying the incoming call, and the PSTN 13 thereafter routes the data via the telephone line 21 to the telephone 14 in step 62. The visual display 26 presents in step 64 the textual information contained in the information data. Such textual information typically includes a menu containing textual information associated with the selected communications service and softkey labels identifying the functions of the softkeys 27.

In response to the textual information presented by the visual display 26, the user can update the displayed information by selecting one of the functions supplied by the softkeys 27. By pressing a selected softkey 27, the telephone 14 generates a command signal for transmission to the system 10 via the PSTN 13. In step 66, the service program 18 monitors the incoming call to determine if the telephone 14 has output a command signal. If a command signal has not been received, the No branch is followed to step 68. The service program 18 subsequently inquires in the step 68 whether the telephone 14 has output a service disconnect signal to terminate the consumer service. If the service disconnect signal has not been received, the No branch is followed to the step. 66 and the monitoring loop is begun again. Alternatively, the Yes branch is followed to step 70 if the service program 18 has received the service disconnect signal.

In the step 70, the service program 18 requests the service circuit node 11 to disconnect the adjunct processor 12 from the ISDN line 20 associated with the incoming call. In turn, the base program 19 issues an instruction to the switching network 28 that opens the allocated three-way conference circuit 41. Accordingly, the communications service is terminated at the step 72, thereby clearing the textual information that had been presented by the visual display 26, and the process ends.

If the service program 18 determines in the step 66 that the telephone 14 has output a command signal, such as to initiate an information update, then the Yes branch is followed from the step 66 to step 74. The adjunct processor 12, specifically the DTMF tone processor 32, converts the DTMF tone sequence of the command signal to supply digital command data for processing by the service circuit node 11 in the step 74. The process is then returned to the step 58 to enable the downloading of additional textual information to the telephone 14 for presentation by the visual display 26. The additional textual information is derived from selected information signals that are responsive to the request forwarded by the command signal.

Figure 6:
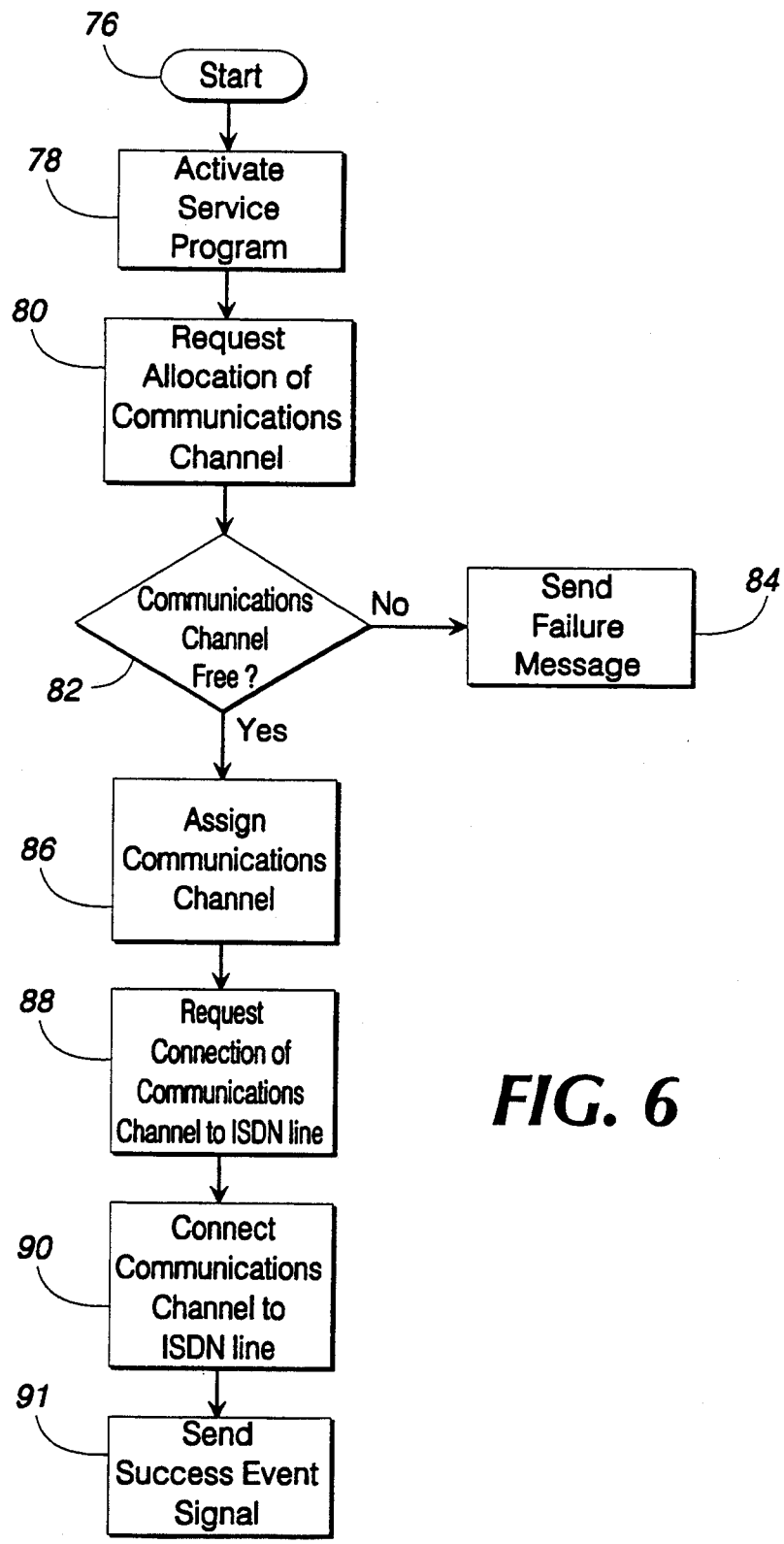
FIG. 6 is a flow chart diagram illustrating the preferred steps executed by the service program and the base program for instructing the service circuit node to connect the adjunct processor to the incoming call on the ISDN line.

FIG. 6 is a flow chart diagram illustrating the preferred steps executed by the service program 18 and the base program 19 for instructing the service circuit node 11 to connect the adjunct processor 12 to the incoming call on the ISDN line 20. Referring to FIGS. 3-4 for the components and FIG. 6 for the process, the process starts at step 76, and in step 78, the service program is activated in response to the service selection signal and computer 30 begins to execute program code. The service program 18 thereafter requests the allocation of one of the communications channels 42 in step 80.

In step 82, the base program 19 examines a list of free communications channels 42 that can be allocated and, if at least one is available, assigns a free communications channel 42 for use by the requesting service program 18 in step 86. However, if all of the communications channels 42 are in use, the base program 19 sends a failure message to the requesting service program 18 in step 84. In response to the failure message, the service program 18 can wait for a predetermined time period and then request again a free communications channel 42, end the selected service and disconnect the incoming call, or route the incoming call to another telecommunications service.

In response to the allocation of the communications channel 42 in step 86, the service program 18 in step 88 issues a request to the base program 19 to connect the allocated communications channel 42 to the incoming call on the ISDN line 20. In step 90, the base program 18 instructs the three way conference circuit 4 1 associated with the allocated communications channel 42 to connect the channel 42 to the incoming call. In step 91, the base program 19 thereafter sends to the service program 18 a success event message that confirms this connection.

Figure 7:
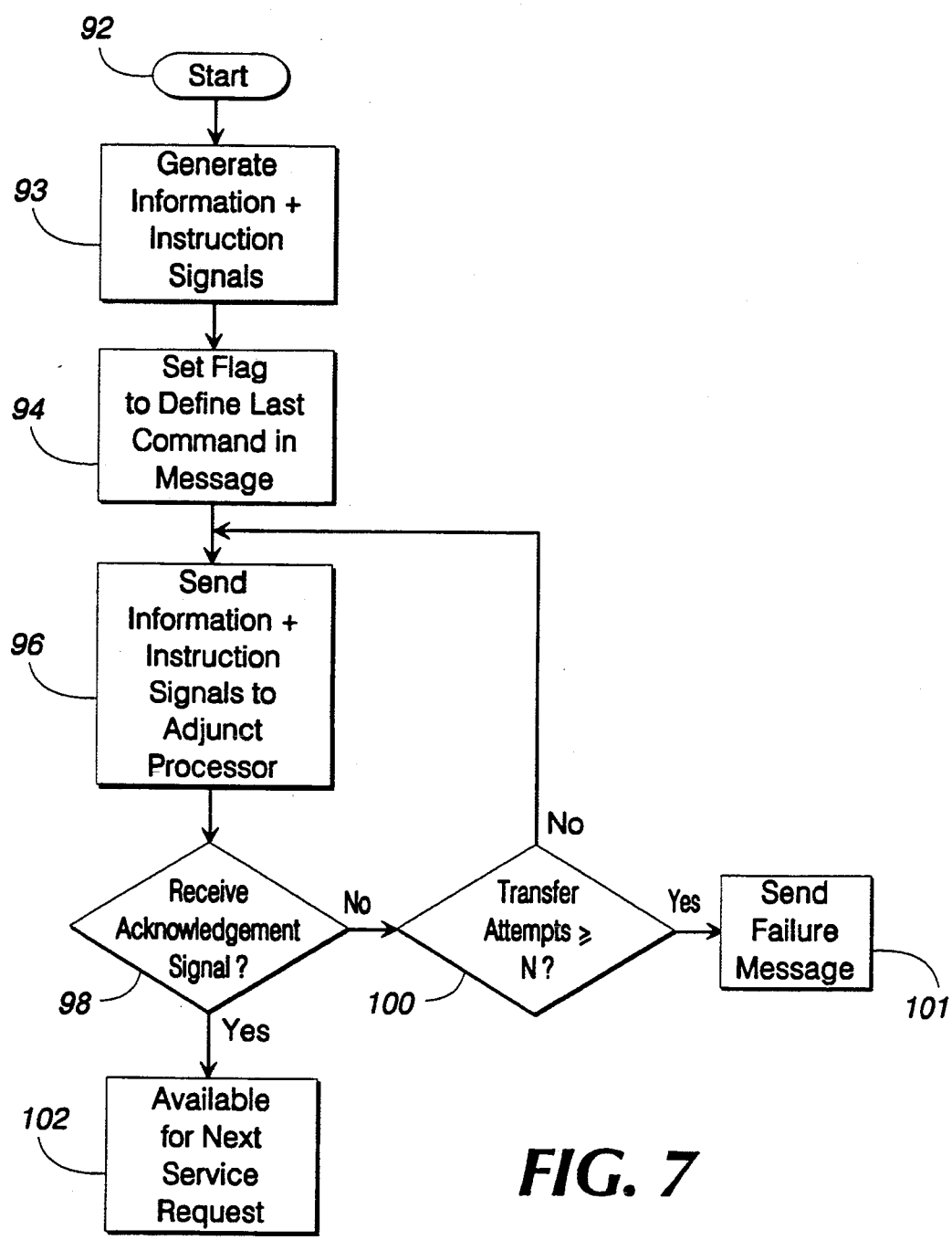
FIG. 7 is a flow chart diagram that illustrates the preferred steps for the transmission of data from the service circuit node to the adjunct processor via the network.

Turn now to FIG. 7, which is a flow chart diagram that illustrates the preferred steps for the transmission of data from the service circuit node 11 to the adjunct processor 12 via the network 22. Referring to FIGS. 3 and 7, the process starts in step 92, and in step 93 the service program 18 generates the information signals that define the textual information to be presented by the display 26 (FIG. 1), the functions of the softkeys 27 (FIG. 1), and certain operations by the telephone 14.

Upon generating a group of information signals to form a message for delivery to the telephone 14, the service program 18 sets a flag during step 94 that defines the final command in the message and transfers the message to the base program 19. In step 96, the group of the information signals are subsequently transferred by the base program 19 to the control program 34 running on the adjunct processor 12. In step 98, the base program 18 inquires whether a message acknowledgment signal has been received from the adjunct processor 12 to confirm that the message transfer has been successfully completed via the network 22. A successful message transfer is preferably indicated by the control program 34 returning the acknowledgment signal to the base program 19 within a specified time-out period. If the message acknowledgment signal has been received, the service program in step 102 is now available to service another request and, accordingly, accepts the next service request.

If the message transfer is not successful, the No branch is followed to the step 100. In the step 100, the base program 18 inquires whether the number of unsuccessful transfer attempts exceeds a predetermined number N. If the answer is no, the No branch is followed to the step 96 and the base program 19 sends the message again. However, after a specified number of unsuccessful message transfer attempts, the Yes branch is followed from the step 100 to step 101. The base program 19 subsequently sends a failure message to the service program 18 in the step 101. In response to the failure message, the service program 18 can conduct any one of the following operations: end the selected service and disconnect the incoming call; request the allocation of different resources and attempt again the action associated with the failure message; attempt again the action associated with the failure message; or route the incoming call to another service, such as a voice mail system.

Figure 8A:
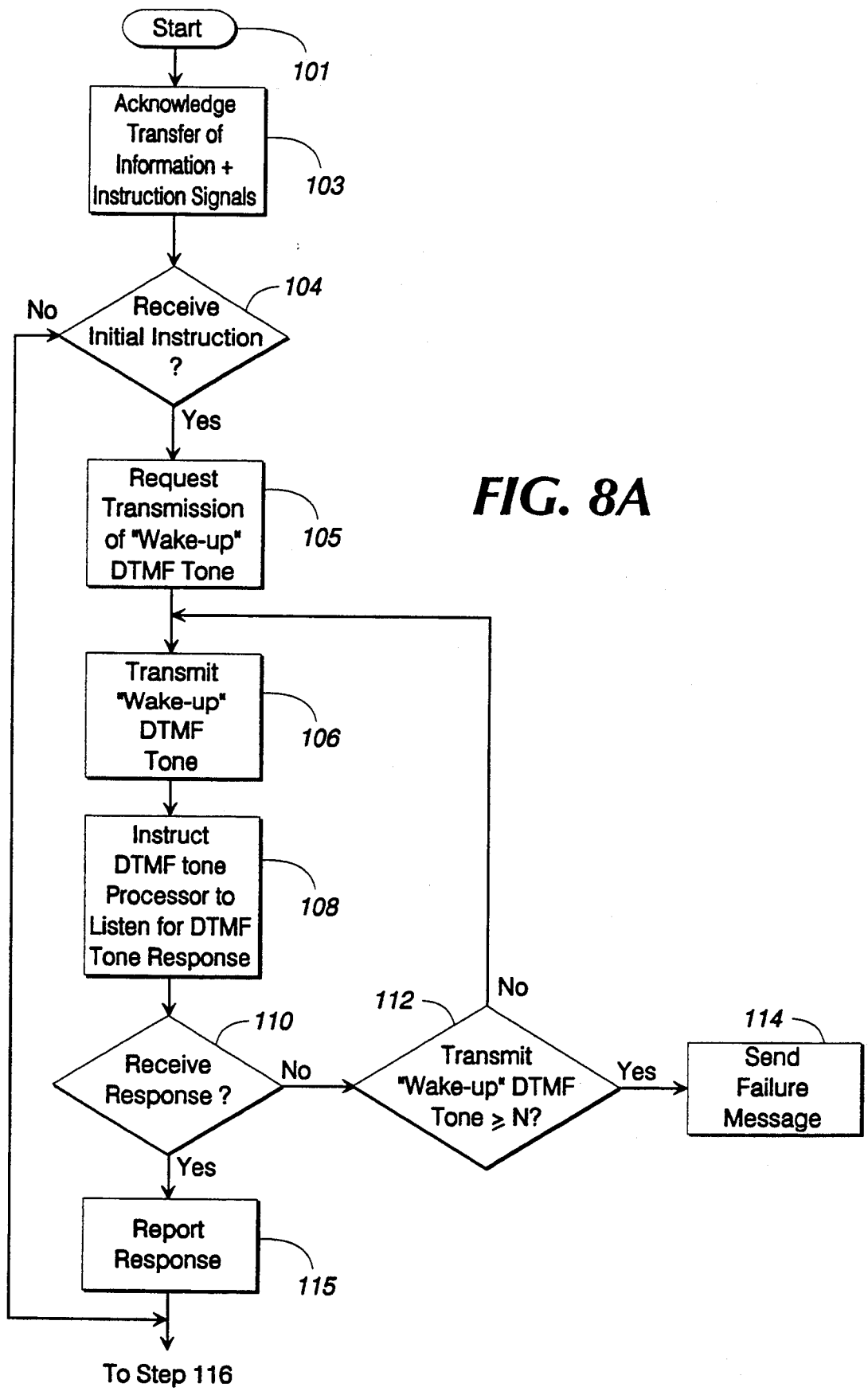
FIGS. 8A-B is a flow chart diagram that illustrates the preferred steps for the transfer of data from the adjunct processor to the incoming ISDN line via the signal connection supplied by the service circuit node.
Figure 8B:
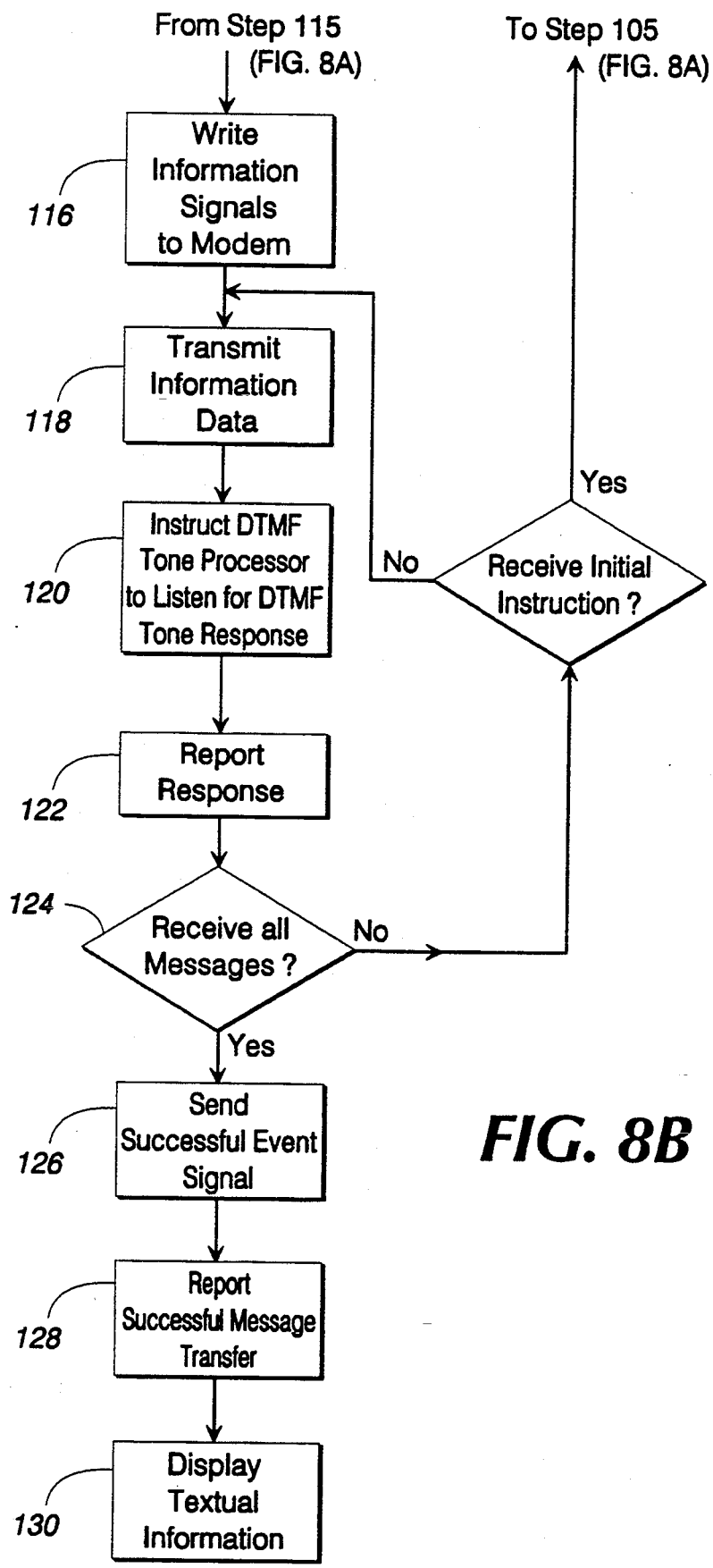

FIGS. 8A and B are flow chart diagrams that illustrate the preferred steps for the transfer of data from the adjunct processor 12 to the incoming ISDN line 20 via the signal connection supplied by the service circuit node 11. Referring to FIGS. 3 and 8, the process starts in step 101 and the control program 34 in step 103 acknowledges the successful message transfer associated with the step 98 of FIG. 7. In step 104, the control program 34 inquires whether the last service command in the message includes the initial instruction. The initial instruction is preferably implemented by designating the mode field (FIG. 11) in the last service command of the message as the "voice" mode. If the answer is no, the No branch is followed to step 116 because it is not necessary to send the "wake-up" DTMF tone sequence if the telephone 14 has already entered the data operating mode. Alternatively, if the telephone has not yet entered the data mode, then the Yes branch is followed to step 105.

In step 105, the control program 34 instructs the DTMF tone processor 32 to output a predetermined DTMF tone sequence for transmission over the telephone line 21 in response to the initial instruction. This DTMF tone sequence supplies the telephone 14 with notice of an impending data transmission and thereby "wakes-up" the telephone 14. In step 106, the DTMF tone processor 32 sends the initial instruction data as the predetermined DTMF tone sequence.

In step 108, the control program 34 instructs the DTMF tone processor 32 to listen for an appropriate response from the telephone 14 that indicates the telephone 14 is ready to receive data. If the DTMF tone processor 32 does not receive the acknowledgment signal in step 110, the No branch is followed to step 112. In the step 112, the control program 34 inquires whether the DTMF tone processor 32 has transmitted the predetermined tone more than a selected number N of times. If the DTMF tone processor 32 has played the tone sequence less than the selected number N of attempts, then the No branch is followed to the step 106 and the DTMF tone processor 32 transmits the tone sequence again. However, if the DTMF tone processor 32 has transmitted the predetermined tone at least a selected number of attempts, then the Yes branch is followed from the step 112 to step 114. In the step 114, the control program sends a failure message to the service program 18 via the network 22. The failure message is received by the base program 19 and thereafter is forwarded to the service program 18. The service program 18 can respond to the failure message by conducting one of the following operations: end the selected service and disconnect the incoming call; request the allocation of different resources and attempt again the action associated with the failure message; attempt again the action associated with the failure message; or forward the incoming call to another telecommunications service, such as a voice mail system.

If the telephone 14 sends an acknowledgment signal in response to the predetermined DTMF tone in step 110, the Yes branch is followed to step 115. The DTMF tone processor 32 reports the reception of the acknowledgment signal to the control program 34. In response, the control program 34 writes the information signals to the allocated modem 31 in the modem rack 37 via the associated serial line 40 in step 116. The modem 31, in turn, modulates a carrier with the information signals to transmit the resulting information data to the telephone 14 via the PSTN 13 in step 118.

In step 120, the control program 34 instructs the DTMF tone processor 32 to listen for a DTMF response from the telephone 14. This DTMF response supplies an indication of how many messages the telephone 14 has received from the system 10. In step 122, the DTMF processor reports to the control program 34 the DTMF digits that it received from the telephone 14. Based upon the received DTMF digits, the control program 34 determines in step 124 whether some messages transmitted to the telephone 14 were lost during the transmission. If some messages were lost, then the No branch is followed to step 125. In the step 125, the control program 34 inquires whether the telephone 14 is operating in the operating mode to properly receive downloaded data based upon whether the control program 34 has received the initial instruction. If the control program 34 has received the initial instruction, then the control program 34 determines that the telephone 14 is not operating in the proper data mode and the Yes branch is followed to the step 104 shown in FIG. 8A. Alternatively, if the control program 34 has not received the initial instruction, then the No branch is followed to the step 118 and the messages are transmitted again by the modem 31.

However, if the control program 34 in the step 124 determines the telephone 14 has received all of the messages, the Yes branch is followed to step 126 and the control program sends a successful event signal to the base program 18 via the network 22. In step 128, the base program 19 forwards the successful event signal to the service program 18 to confirm the successful transfer of data to the telephone 14.

In step 130, the visual display connected to the telephone 14 presents the textual information contained in the information data, typically a menu that welcomes the caller to the service. The functions of the softkeys are also defined in response to the information data. This completes the initial transfer of textual information and softkeys to the telephone 14 by the system 10.

Figures 9, 10:
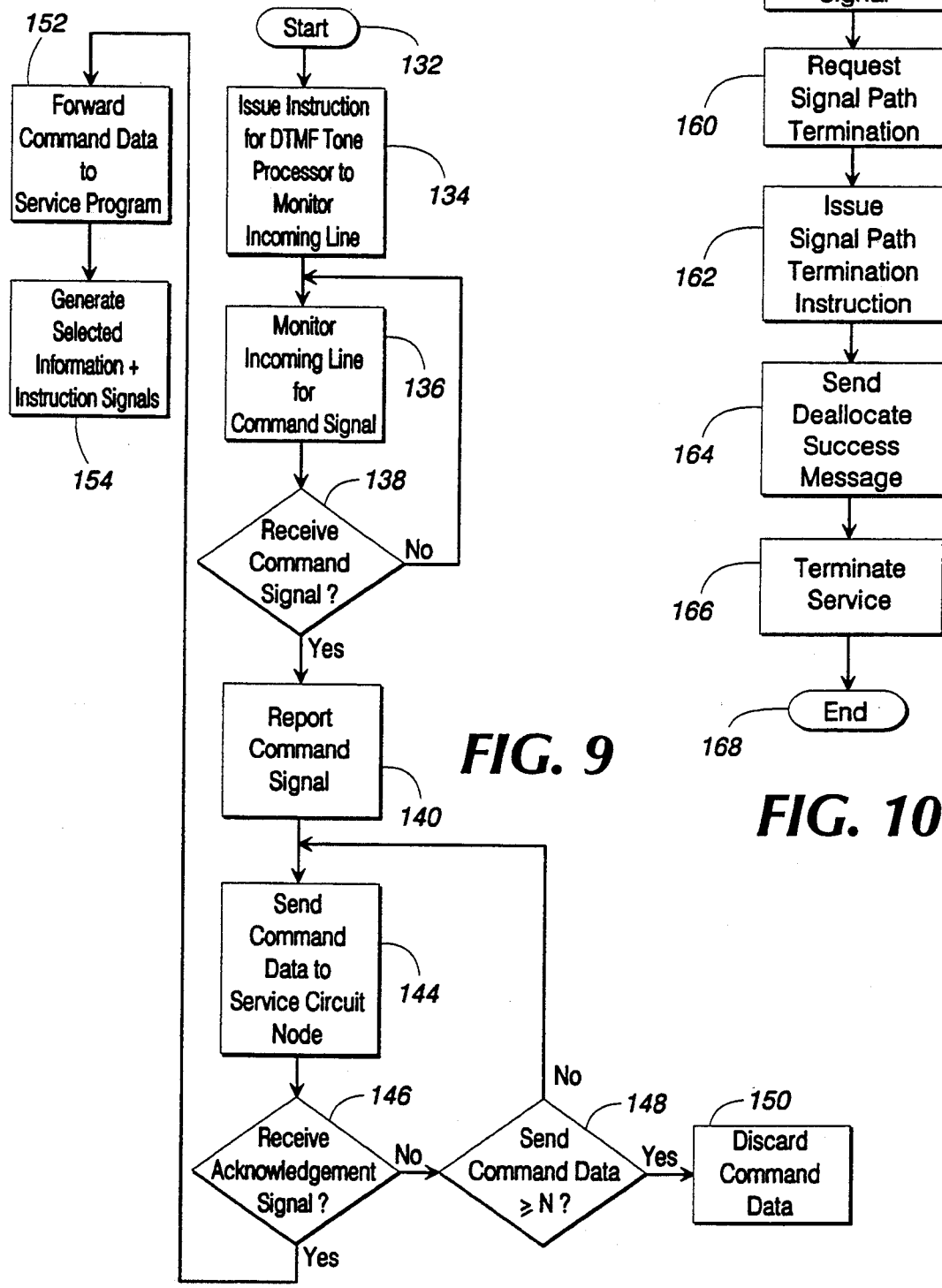
FIG. 9 is a flow chart diagram that illustrates the preferred steps executed by the system in response to a command signal containing a request for updated information.
FIG. 10 is a flow chart diagram that illustrates the preferred steps taken by the system in response to a service disconnect signal output by the telephone to terminate the selected communications service.

FIG. 9 is a flow chart diagram that illustrates the preferred steps executed by the system 10 in response to a command signal representing a request for updated information. Referring now to FIGS. 3 and 9, the program starts at step 132 and the control program in step 134 instructs the DTMF tone processor 32 to monitor the connected ISDN line 20 for an incoming command signal. In response, the DTMF tone processor 32 listens for a command signal (DTMF tones) in step 136. If the DTMF tone processor 32 does not receive one or more DTMF tones in step 138, the No branch is followed to the step 136 and the monitoring process continues. However, if the DTMF tone processor receives one or more DTMF tones, the Yes branch is followed to step 140. The DTMF tone processor 32 reports the reception of the command signal to the control program 34 in the step 140. In turn, the control program 34 outputs command data to the base program 19 in the service circuit node 11 via the network 22 in step 144.

In step 146, the control program 34 inquires whether the adjunct processor 12 has received an acknowledgment signal from the service circuit node 11 within a predetermined time period to confirm a successful transfer of the command data. If the acknowledgment signal is not received within the predetermined time period, the No branch is followed to step 148. In the step 148, the control program 34 inquires whether the number of times that the adjunct processor 12 has resent the command data exceeds a specified number of attempts. If so, the Yes branch is followed to step 150 and the control program 34 simply discards the command data. If the number of attempts has not been exceeded, the No branch is followed to the step 144 and the control program 34 forwards the command data to the service circuit node 11 again.

If the service circuit node 11 properly acknowledges the successful reception of the command data, the Yes branch is followed from the step 146 to step 152. In step 152, the base program 19 forwards the command data to the service program 18. In response, the service circuit node 11 in step 154 generates the selected information signals that are responsive to the particular request for updated information. Accordingly, the information download process begins again, as previously described with respect to FIG. 8.

FIG. 10 is a flow chart diagram that illustrates the preferred steps taken by the system 10 in response to a service disconnect signal output by the telephone 14 to terminate the selected communications service. Referring to FIGS. 3 and 10, the process starts at step 156 and, in step 158, the service program 18 receives the service disconnect signal. In response, the service program 18 in step 160 requests that the base program 19 issue instructions to terminate the signal path between the allocated resources of the adjunct processor 12 and the ISDN line 20 carrying the incoming call. The base program 19 in step 162 issues instructions to the switching network 28 to open the three way conference circuit 41, thereby breaking the signal path between the ISDN line 20 and the allocated communications channel 42. In step 164, the base program reports this action by sending a deallocate success message to the service program 18. The service program 18 receives the deallocate success message at step 166 and, in response, terminates the selected communications service to exit the service program 18 in step 168. The telephone 14 clears the visual display 26 upon the termination of the service.

Figure 11:
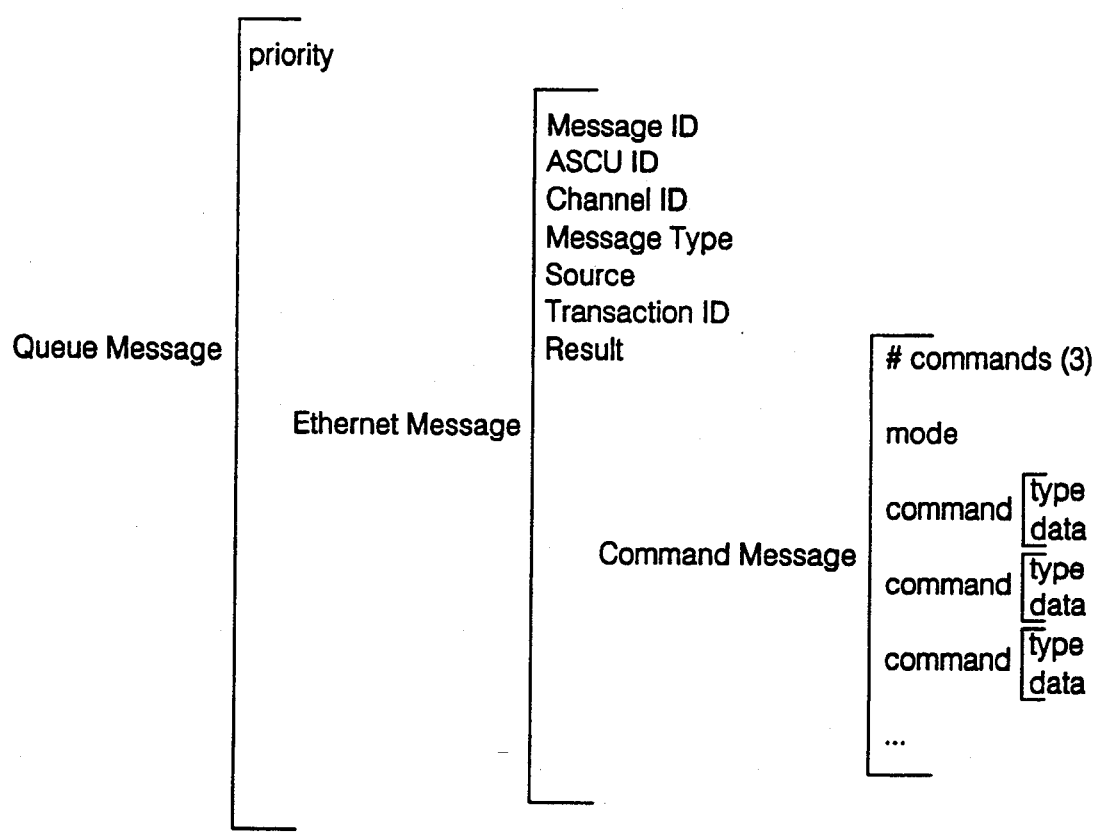
FIG. 11 is a diagram illustrating the preferred message structures for the present invention.

FIG. 11 is a diagram that illustrates the message structure for the messages exchanged between the service circuit node 11 and the adjunct processor 12 over the network 22. As shown in FIG. 11, at least three message structures are used for the exchange of information between the service circuit node 11 and the adjunct processor 12. The three preferred message structures are a queue message, an Ethernet message, and a command message.

The queue message is a wrapper for an underlying Ethernet message. It will be appreciated that UNIX IPC messages should include a priority number followed by a message being sent. Accordingly, the queue message comprises a priority field, preferably always 1, followed by a preferred Ethernet message structure.

The Ethernet message is the highest level of information passed over the preferred Ethernet 22 and comprises a particular Ethernet message structure. The Ethernet message structure comprises a header and an actual message. The header contains: Message Identification (ID); Adjunct Service Circuit Unit (ASCU) ID; Channel ID; Message Type; Source; Transaction ID; and Result Field. The primary portion of the Ethernet message structure is the Command message that contains the high level representation of commands to and from the telephone 14.

The Message ID is a unique integer that identifies a particular Ethernet transmission. If the Ethernet message is transmitted again because of a communication failure, this message will have the same Message ID as the original Ethernet message. The ASCU ID identifies the specific computer 34 that the Ethernet message is bound for or coming from because more than one adjunct processor 12 can be connected to the network 12. Each computer 34 is assigned a unique integer identifier. The Channel ID identifies the allocated communications channel 42 associated with the Ethernet message. Each allocated communications channel 42 is identified by a unique integer identifier. The Message Type defines the type of Ethernet message. Messages can be of several types, including "Command" messages for transmitting data to the telephone 14; "Are You There" messages for inquiring about the status of the software routines of the system 10; "Reply" messages which indicate the number of commands that were successfully downloaded to the telephone 14; "Exit" messages for bringing the system 10 down; and "Acks" messages that indicate the successful transfer of an Ethernet message. The Source field identifies the software routine that originated the Ethernet message. The Transaction ID is a unique integer that identifies a complete message containing a group of commands for downloading to the telephone 14. The Result field identifies the number of commands successfully downloaded to the telephone 14.

The Command message contains the number of commands (# Commands) in the message array, the mode (voice or data) for the telephone 14 and, an array of individual commands, specifically the information signals. For the Command message shown in FIG. 11, the array contains three commands. Because multiple commands can be multiplexed together into one downloaded message, as many commands as possible are packed into the Ethernet message. However, the UNIX message size is a limiting factor of combining the commands because UNIX messages are constrained to a maximum size. An actual command is represented by a structure that supplies its type, such as load softkey or initialize display, and the actual data.

FIG. 12 is a diagram that provides a top view of the face of a typical ADSI-compatible telephone. Referring to FIG. 12, the face of the telephone 14 appears similar to a conventional telephone with the exception of a visual display 26 located in the top central portion of the telephone face and a set of softkeys 27 positioned on below the display 26. Similar to a conventional telephone, the telephone 14 includes a well-known handset 200 and dial pad 202 having a plurality of dialing buttons or keys 204. The telephone 14 operates in the same fashion as a conventional telephone for receiving and transmitting voice data and it satisfies well-known communications standards for interfacing with a typical PSTN 13. However, the telephone 14 must be set to voice mode before it can properly receive or transmit voice data. Likewise, the telephone 14 should be set to data mode prior to receiving actual data.

When a user presses a softkey 27, the telephone 14 generates a user-initiated event that is reported back to the service program 18. Because the softkeys are generally programmed to implement a defined function by sending a DTMF tone sequence, any DTMF digits generated on the telephone line 21 are collected and reported as an event to the service program 18. Thus, an event is reported whether the digits were generated by a softkey press or via the dial pad. DTMF digits transmitted over the telephone line 21 must have a minimum time-out interval between them to be reported as a single event to the service program 18. Unlike a digit string generated by the telephone 14 in response to a softkey press, a user pressing the dial pad 202 generally does not meet the time-out interval. Accordingly, a user pressing 1-2-3 typically generates a sequence that is reported as three separate events having one digit per event. In contrast, a softkey-generated string of 1-2-3 is reported as a complete digit string in a single event.

A display scroll panel 206 is also located on the face of the telephone 14, preferably adjacent to the visual display 26. The display scroll panel 206 includes one or more buttons 208 that enable the user to scroll the information presented by the visual display 26 in response to pressing one of the buttons 208. Each button 208 permits the user to implement a particular scroll function, such as to scroll down, to scroll up, or to scroll in a horizontal direction. The display scroll panel 206 is particularly useful for a visual display 26 that presents multiple lines of information or for a telephone 14 that can process more characters than the display 26 can present on a single line.

The telephone 14 further includes optional features, such as a speaker 210 and one or more hard keys 212. The speaker 210 can be a one-way speaker that permits a user to listen to audio information, such as a telephone conversation or a recorded message, without using the conventional handset 200. Alternatively, the speaker 210 can be a two-way speaker to permit the user to carry on a hands free telephone conversation without the use of the handset 200. The hard keys 212 are useful to implement optional features associated with communications services. Unlike the programmable softkeys 27, each feature associated with an optional hard key 212 is hard wired. Accordingly, a selection of a particular hard key 212 always produces the same response associated with that hard key.

FIGS. 13-29 are diagrams that illustrate a variety of menus that can be displayed by the visual display 26 for a movie hotline communications service. The movie hotline communications service, which is directed to the subject of movies playing at local cinemas, represents a typical information service that can be offered by a service provider through the use of the system 10. The movie hotline service downloads information for presentation to the caller and permits the caller to make information choices with defined softkeys. It will be appreciated that an information service supplied by the system 10 can be directed to almost any subject of information that would be of interest to a calling party. Accordingly, the movie hotline service is only one example of an information service that can be implemented by the system 10. For example, other information services include a service that allows a caller to place a catalog order, a service that allows a caller to locate a local restaurant, and a service that allows the caller to review a schedule for special events, such as concerts or theatrical productions.

As previously described, the movie hotline communications service supplies the caller with information concerning movies playing at local cinemas by presenting such information on the visual display 26. The caller initiates the movie hotline communications service by calling a predetermined telephone number associated with the movie hotline service. The first menu presented by the service to the caller is shown in FIG. 13. This menu is representative of the menu information and softkey labels for the menus shown in the remaining FIGS. 14-29.

Referring to FIG. 12 for a view of the telephone 14 and to FIG. 13 for a view of the menu, the presented menu is a Welcome menu that enables the caller to search for a cinema or a 0 movie by pressing the SELECT softkey when the appropriate menu line is actively displayed by the visual display 26. A caller begins at the top of a menu, with the first line actively displayed by the visual display 26. Each menu line is associated with a line of display memory for the telephone 14. The text in the first column, also referred to as the primary column, is displayed on the top line of the display 26. Text in the second column, otherwise referred to as the secondary column, is displayed on the second line of the display 26. The shaded area in a menu line represents softkey labels. For the menu shown in FIG. 13, the labels SELECT, HELP, and QUIT appear when the third, fourth, or fifth lines of the menu are presented on the display 26. In contrast, no softkey labels are present when the first two menu rows are displayed and, accordingly, no softkeys are active for the first and second display lines.

The Up, Down, and Horizontal scroll keys 208 located on the telephone 14 are used to scroll through the menu, thereby enabling the caller to view information among the lines of a given menu. The functions supplied by the softkeys 27 become active on a line by line basis when appropriate. Specifically, a softkey becomes active when a softkey label is shown on an active line of the display 26.

The preferred telephone 14, the Sesame CPE, allows up to five softkeys to be defined per menu line. However, only three softkey labels can be simultaneously displayed on a single display line. Accordingly, the fourth and fifth softkey labels are shown in the second column of the menu, thereby indicating that the text is actually displayed on the second line of the display. The horizontal scroll keys are used to move between the five softkey labels. It will be appreciated that a telecommunications device that fully satisfies the ADSI standards drafted by Bell Communications Research includes a minimum of six softkeys.

For the menus of the movie hotline service shown in FIGS. 13-29, certain softkeys are defined by labels to indicate that those softkeys are useful for menu traversal. The softkey labels include SELECT, BACKUP, RESTART, RETURN, and QUIT. The caller can choose a current menu item by pressing the SELECT softkey. By pressing the BACKUP softkey, the caller can view the previous menu. Likewise, the caller can view the top most menu, otherwise referred to as the initial service menu, by pressing the RESTART softkey. By pressing the RETURN softkey, the caller can view an intermediate menu that the caller has previously viewed during the service. The caller can exit the movie hotline service by pressing the QUIT softkey. Other softkeys 27 are defined by labels that indicate an action for a menu item. The action softkey labels include: HELP; CLEAR; ERASE; INFO; STATUS; SEND; CANCEL; SEARCH; ORDER; and PAGE. The caller can view context-sensitive help information by pressing the HELP softkey. Data entered by a caller on a menu line by use of the telephone dial pad 202 is cleared by pressing the CLEAR softkey. Similarly, the last character of data entered by the caller is erased if the caller presses the ERASE softkey. The caller can obtain context-sensitive voice announced information if the caller presses the INFO softkey. Alternatively, the caller can press the STATUS softkey to view context sensitive textual information. To send data entered on a menu line, the caller presses the SEND softkey. The caller can cancel a transaction by pressing the CANCEL softkey. The service searches for an item that was entered via an alphanumeric input when the caller presses the SEARCH softkey. The service starts a transaction when the caller presses the ORDER softkey. The caller can view another page of items in a menu by pressing the PAGE softkey.

Still referring to the menu shown in FIG. 13, the first menu line is initially presented by the display 26 and informs the caller that the provided service is the "Movie Hotline." This menu line also requests the caller to scroll down to start the viewing of the service menus. Upon scrolling down by selecting the scroll down key 208, the caller views the next menu line on the display 26, which requests that the caller "Please select from these options:" Again, the caller has the option of using the display scroll panel 206 to move to the previously displayed menu line (line 1) or to move forward to the next menu line (line 3). Upon selecting the down scroll key 208, the caller views menu line 3 on the display 26.

From menu line 3, the caller can view the cinema locations in the caller's local area. By pressing the SELECT softkey, which is indicated by the SELECT softkey label in the highlighted portion of the menu, the caller can choose the current menu item, in this case cinema locations. Alternatively, if the caller selects the HELP softkey, the caller reviews context sensitive help information on the display 26. The caller can exit the movie hotline service by selecting the QUIT softkey. From the menu line 3, the caller also can use the Up or Down scroll keys 208 to view a previously displayed menu or to view the next menu. In similar fashion, menu line 4 allows the viewer to receive textual information concerning movies showing in the caller's area and menu line 5 allows the caller to search for a movie of the caller's choice. The interaction of the Welcome menu with other menus supplied by the movie hotline service is described below with respect to FIGS. 30A-B.

Figure 30A:
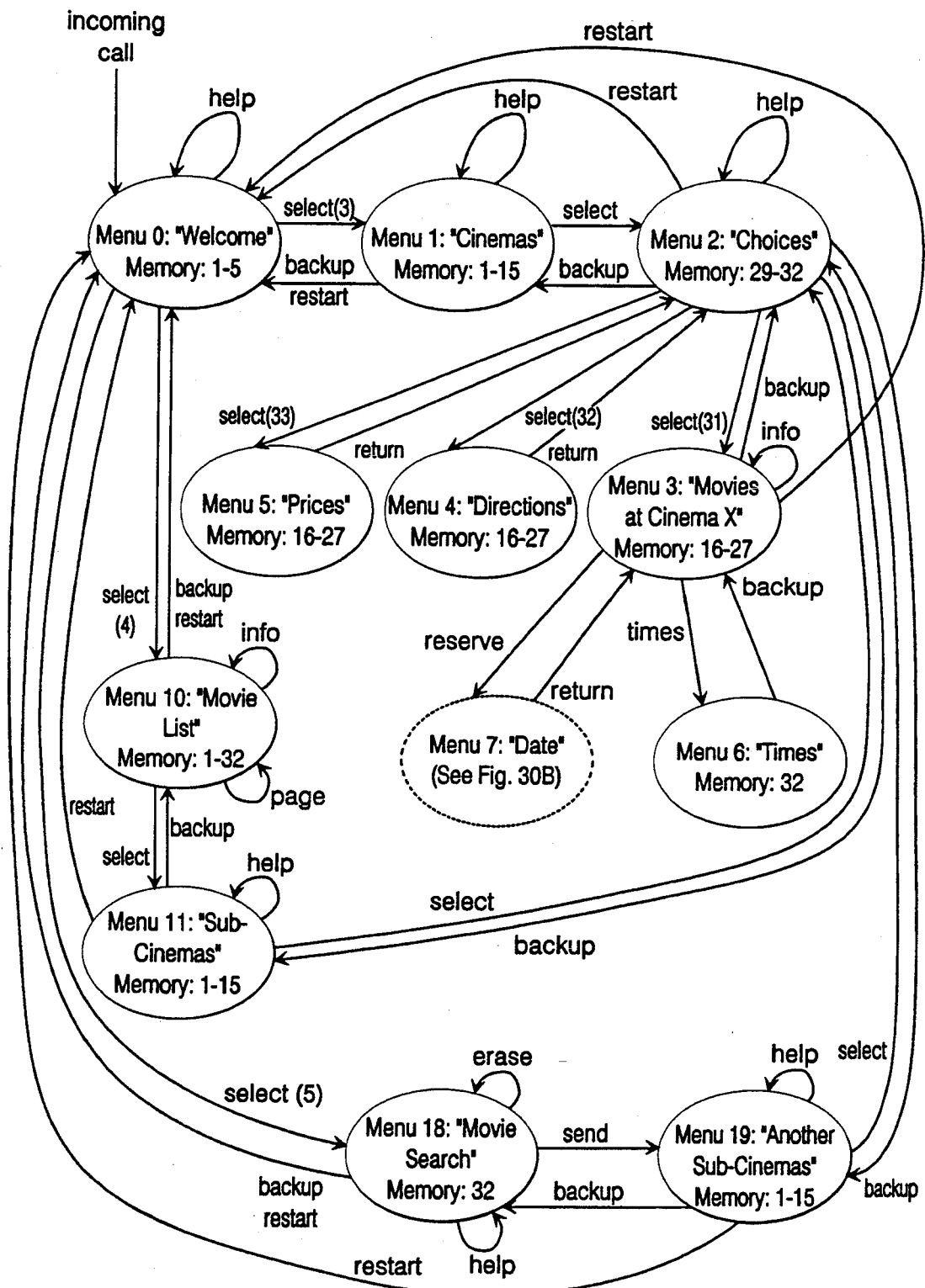
FIGS. 30 A-B are state diagrams that illustrate the sequence of menus presented by the visual display of the telephone for the menus shown in FIGS. 13-29 for the movie hotline service.
Figure 30B:
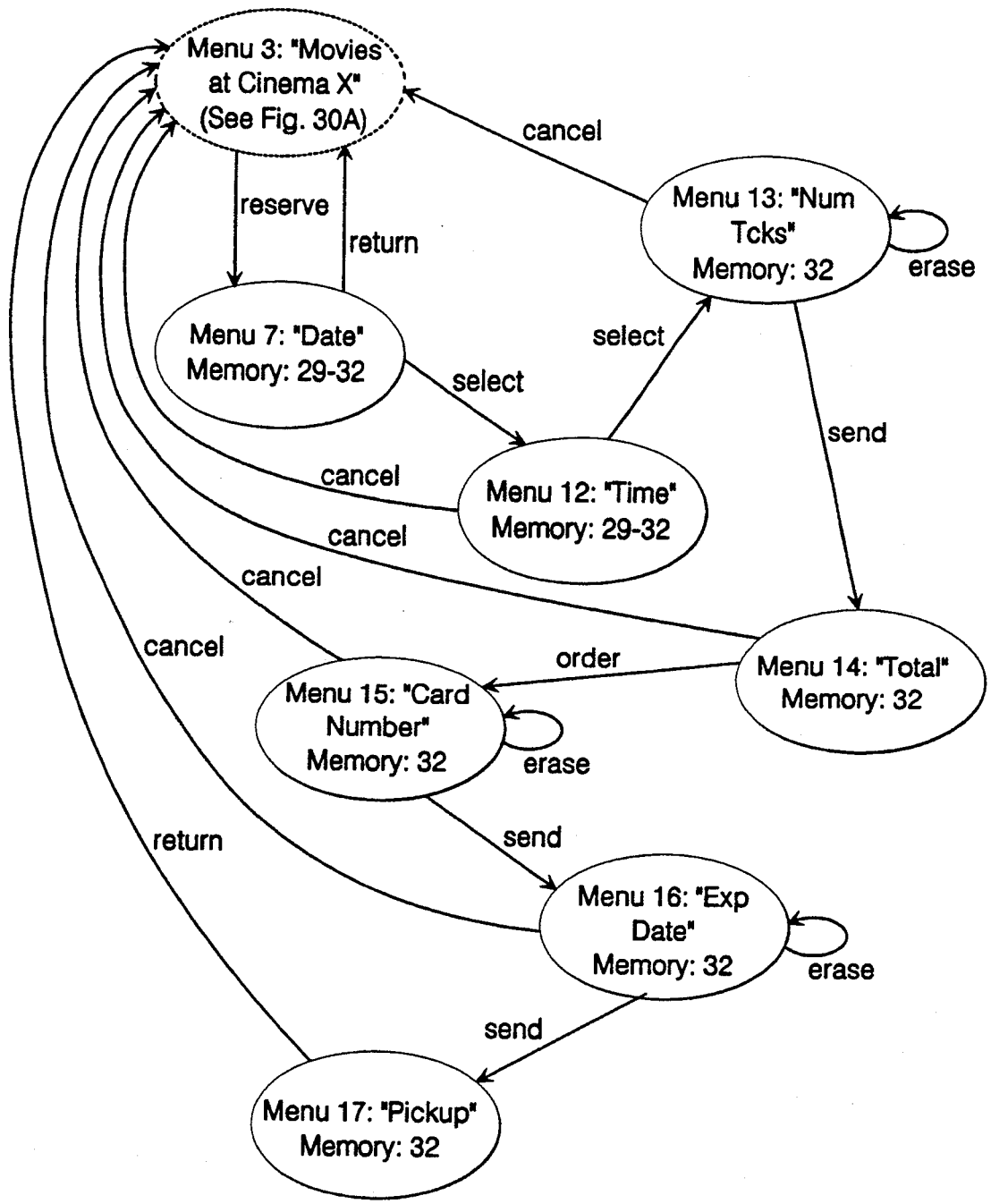

FIGS. 30A-B are state diagrams that define the sequence of menus for the movie hotline communications service. Referring now to FIGS. 12-13 and 30A-B, the Welcome menu, otherwise referred to as menu 0, is presented to the calling party by the visual display 26 in response to an incoming call to the movie hotline service offered by the system 10. The menu information is stored within lines 1-5 of the telephone display memory. In the event that the user presses the SELECT softkey when line 3 of the Welcome menu is actively displayed, the Cinemas menu, otherwise referred to as menu 1, is downloaded to the telephone 14. FIG. 14 is an illustration of a typical "Cinemas" menu 1. The Cinemas menu is stored within lines 1-15 of the telephone display memory and permits the caller to select a cinema of interest from the displayed list of cinemas. Alternatively, in the event that the user presses the SELECT softkey when line 4 of the Welcome menu is actively displayed, the Movie List menu, otherwise referred to as menu 10, is downloaded to the telephone 14. FIG. 21 is an illustration of a typical "Movie List" menu 10. The Movie List menu 10 is stored within lines 1-32 of the telephone display memory and allows the caller to review a list of movies playing in the local area by use of the scroll keys 208.

For the Cinemas menu, the caller is presented with 0 three softkeys by each actively displayed line of the menu, specifically the SELECT, BACKUP, and RESTART softkeys. If the caller presses the SELECT softkey, the Choices menu, otherwise referred to as menu 2, is downloaded into lines 30-33 of the display memory of the telephone 14. FIG. 15 is an illustration of a typical "Choices" menu 2. The Choices menu permits the caller to view information about the selected cinema. For example, the caller can view the movies playing at the selected cinema, receive directions to the cinema, or review pricing information for the selected cinema. Alternatively, if the caller presses either the BACKUP or the RESTART softkeys from the Cinemas menu, then the Welcome menu is downloaded to the telephone 14 and displayed by the visual display 26.

For the Choices menu, the user can review information concerning movies at a specific cinema by pressing the SELECT softkey when the menu line 31 is actively displayed by the display 26. In response, the Movies at Cinema X menu, otherwise referred to as menu 3, is downloaded to the telephone 14 and stored within lines 16-27 of the telephone display memory. FIG. 16 is an illustration of a typical "Movies at Cinema X" menu 3. The menu 3 presents the caller with a list of movies playing at a specific cinema. The caller also can hear a short announcement of audio information about a movie, review the playing times for a movie, or reserve a ticket for a movie from menu 3. However, if the caller presses the SELECT softkey when menu line 32 of the Choices menu is active, the Directions menu, otherwise referred to as menu 4, is subsequently presented by the display 26. FIG. 17 is an illustration of a typical "Directions" menu 4. The Directions menu is stored within lines 16-27 of the telephone display memory and enables a caller to review directions to a selected cinema by scrolling through the presented menu information. In the event that the caller presses the SELECT softkey when menu line 33 of the Choices menu is actively displayed, the Prices menu, otherwise referred to as the menu 5, is downloaded into lines 16-27 of the telephone display memory. FIG. 18 is an illustration of a typical "Prices" menu 5. The Prices menu permits a caller to review the prices for a selected cinema by scrolling through the menu lines. The user can return to the Cinemas menu by pressing the BACKUP softkey that is displayed by each active line of the Choices menu. Likewise, the caller can return to the Welcome menu by pressing the RESTART softkey, which is active on each line of the menu.

For the Movies at Cinema X menu, the caller can hear audio information concerning the movie shown on an active menu line by pressing the INFO softkey. The caller also can obtain the playing times for a movie shown on an active menu line by pressing the TIMES softkey. This causes the system 10 to download the Times menu, otherwise referred to as menu 6, into line 32 of the telephone display memory. FIG. 19 is an illustration of a typical "Times" menu 6. The Times menu presents the caller with the playing times for the selected movie.

By pressing the RESERVE softkey from the Movies at Cinema X menu, the Date menu, otherwise referred to as the menu 7, is downloaded into lines 29-32 of the telephone display memory. FIG. 20 is an illustration of a typical "Date" menu 7. The Movies at Cinema X menu, in combination with the menus 7, 12, 13, 14, 15, 16, and 17, permit a caller to reserve and purchase a ticket to a selected movie. The Date menu enables the caller to select the reservation date for the selected movie. FIG. 23 is an illustration of a typical Time menu 12. Menu 12, otherwise referred to as the Time menu, allows the caller to select the reserved time to view the selected movie. FIG. 24 is an illustration of a typical "Number of Tickets" menu 13. Menu 13, otherwise referred to as the Number of Tickets ("Num Tcks") menu, allows the caller to select the number of reserved tickets for the selected movie. FIG. 25 is an illustration of a typical "Total" menu 14. Menu 14, otherwise referred to as the Total menu, permits the caller to view the total cost of reserved tickets for the selected movie. FIG. 26 is an illustration of a typical "Card Number" menu 15. Menu 15, otherwise referred to as the Card Number menu, allows the caller to enter a credit card number for payment of the movie reservation. FIG. 27 is an illustration of a typical "Expiration Date" menu 16. Menu 16, otherwise referred to as the Expiration Date ("Exp. Date") menu, allows the caller to enter the expiration date of the credit card used for the payment of the movie reservation. FIG. 28 is an illustration of a typical "Pickup" menu 17. Menu 17, otherwise referred to as the Pickup Menu, allows the caller to select the pickup location for the reserved tickets, such as the advanced sales window of the cinema showing the selected movie.

If the display 26 presents the Directions Menu, the caller can press the RETURN softkey from any active menu line to return to the Choices menu. Likewise, if the display 26 is showing the Prices menu, the caller can return to the Choices menu by pressing the RETURN softkey from any active line of the Prices menu. The caller can return to the Movies at Cinema X menu from the Times menu by pressing the BACKUP softkey. Similarly, the viewer can return to the Movies at Cinema X menu from the Date menu by pressing the RETURN softkey from any active line of the Date menu.

From the Movie List menu, the caller can select a movie shown on an active line of the menu by pressing the SELECT softkey. In response to the SELECT softkey, the system 10 downloads the Sub-Cinemas menu, otherwise referred to as menu 11, to lines 1-15 of the display memory. FIG. 22 is an illustration of a typical Sub-Cinemas menu 11. The Sub-Cinemas menu is similar to the Cinemas menu, menu 1, and shows a list of cinemas playing the selected movie. By pressing the INFO softkey during any active line of the Movie List menu, the caller can hear audio information concerning the selected movie. By pressing the PAGE softkey, the user can review a second page of information concerning movies that were not listed by the original page of information presented by the visual display 26. This second page of information also will be presented by the visual display 26. The PAGE softkey is typically used when displaying a list of menu items that exceeds the display memory capacity of the telephone 14. Both the BACKUP and RESTART softkeys permit the caller to return to the initial Welcome menu. In response to either of those softkeys, the system 10 downloads the Welcome menu into lines 1-3 of the telephone display memory.

For the Sub-Cinemas menu, if the caller presses the SELECT softkey to select a particular cinema shown on an active menu line, the system 10 downloads the Choices menu to the telephone 14. From the Choices menu, the caller can review information concerning the selected cinema. The selection of the BACKUP softkey causes the system 10 to download the previous Movie List menu to the telephone 14. Similarly, the RESTART softkey permits the caller to return to the initial Welcome menu.

From the Time menu, the caller can select a reservation time for the selected movie by pressing the SELECT softkey for the desired time shown in an active menu line. The SELECT softkey also causes the system 10 to download the 5 Number of Tickets menu to the telephone 14 to continue the steps for making a movie reservation. The caller can return to the Movies at Cinema X menu by pressing the CANCEL softkey from any active menu line.

For the Number of Tickets menu, the caller can communicate the number of desired movie ticket reservations to the movie hotline service by pressing the SEND key after entering the number of tickets. The caller typically enters the number of desired tickets by use of the dial pad 202 on the telephone 14. The caller is presented with the Total menu in response to pressing the SEND softkey. The caller can clear the number of tickets shown by the display 26 by pressing the CLEAR softkey from the Number of Tickets menu. The user then can enter a new tickets number. However, the movie reservation is cancelled and the user returns to the Movies at Cinema X menu if the user selects the CANCEL softkey from the Number of Tickets menu.

For the Total menu, the caller places the reservation order by pressing the ORDER softkey. This causes the system 10 to download the Card Number menu to the telephone 14. The Card Number menu requests the credit card account number for the payment of the reserved movie tickets. The caller can cancel the movie reservation by pressing the CANCEL softkey.

The caller can communicate the credit card account to the system 10 number for the payment of a movie reservation by pressing the SEND softkey from the Card Number menu. However, if the caller enters an incorrect credit card account number, the caller can erase the entry by pressing the CLEAR softkey. The caller can cancel the movie reservation by pressing the CANCEL softkey.

For the Expiration Date menu, the caller can communicate the expiration date for the credit card used for payment of the movie reservation by pressing the SEND softkey. This causes the system 10 to download the Pickup menu to the telephone 14. The Pickup menu permits the caller to review the ticket pickup location for the reserved movie tickets. If the caller wishes to clear the entered expiration date, the caller can press the CLEAR softkey from the Expiration Date menu. In addition, the caller can cancel the movie reservation by pressing the CANCEL softkey from that menu. In response, the system 10 downloads the Movies at Cinema X menu.

By the caller pressing the RETURN softkey from the Pickup menu, the system 10 downloads the Movies at Cinema X menu to the telephone 14.

FIG. 29 is an illustration of a typical "Movie Search" menu 18. The Movie Search menu is downloaded to the telephone 14 if the caller presses the SELECT softkey when menu line 5 of the Welcome menu is actively displayed by the display 26. The caller can enter the name of a movie from the Movie Search menu and the system 10 will download information concerning the cinemas that are showing the selected movie. The entered movie title is communicated to the system 10 when the caller presses the SEND key from the movie search menu. If the search for the movie is successful, the Another Sub-Cinemas menu is downloaded by the system 10 to display the cinema names. The Another Sub-Cinemas menu, otherwise referred to as menu 19, is similar to menu 11 shown in FIG. 22. However, if the search is unsuccessful, the caller will hear a voice announcement indicating that the selected movie is not playing locally. At this point, the caller is given an opportunity to search for another movie. The caller can erase the entered movie title by selecting the CLEAR softkey from the Movie Search menu. Both the BACKUP and RESTART softkeys allow the caller to return to the initial Welcome menu.

By the caller pressing the SELECT softkey from the Another Sub-Cinemas menu, the system 10 downloads the Choices menu. The caller can return to the Movie Search menu by pressing the BACKUP softkey from the Another Sub-Cinemas menu. Similarly, the caller can return to the initial Welcome menu by pressing the RESTART softkey.

As previously described, a typical control communications service for the system 10 is the use of an ADSI-compatible telephone to visually guide a user through the administration of complex AIN services. FIGS. 31A-F and 32A-F are diagrams that illustrate typical menus for the administration of a personal number service. Each of the menus are illustrated as actually displayed by a Sesame-compatible telephone.

Figure 31A:
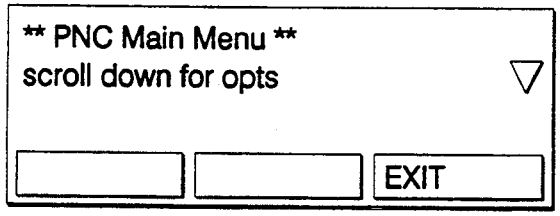
FIGS. 31 A-F are diagrams illustrating the menus and associated softkeys for an ADSI service supplied by the present invention to administer a telephony service.

Referring now to FIGS. 31A-F and 32A-F, a main menu for the personal number administration service is shown in FIG. 31A. The user can exit the service by pressing the EXIT softkey. As indicated by the main menu, the caller can also scroll down to review options for the AIN service. By pressing the EXIT softkey for any of the menus shown in FIGS. 31A-F or 32A-F, the caller can exit the AIN service.

Figure 31B:
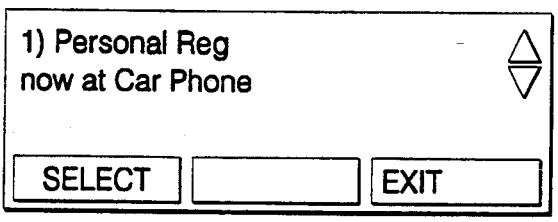

FIG. 31B is a diagram illustrating the first menu option for the personal number administration service. This menu indicates that the caller's personal number is at present registered at their car phone. By pressing the SELECT softkey, the caller can select another telephone source for the registration of the caller's personal number. Either the Up or Down softkey can be used by the caller to move between menus.

Figure 31C:
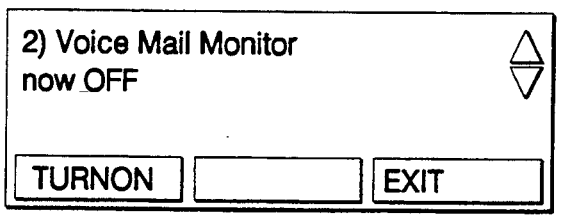

FIG. 31C indicates that the voice mail monitor is at present turned OFF. To turn this service ON, the caller must press the TURNON softkey. Again, the caller can scroll between the menu options by pressing the Up or Down scroll keys.

Figure 31D:
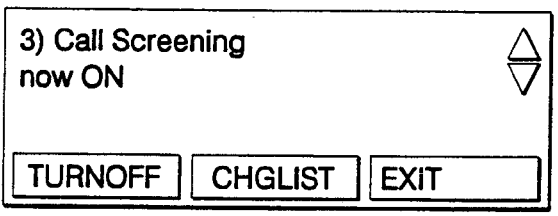

FIG. 31D displays a menu which indicates that the call screening option is at present turned ON. If the caller desires to turn OFF the call screening option, the caller must press the TURNOFF softkey. However, if the caller selects the CHGLIST softkey, the caller can add new telephone numbers to their screening list by reviewing a series of steps that permit the caller to enter the number and to record the name of the caller associated with that number. The caller can review a previous or future menu by scrolling through the menus upon pressing the either the Up or Down scroll key.

Figure 31E:
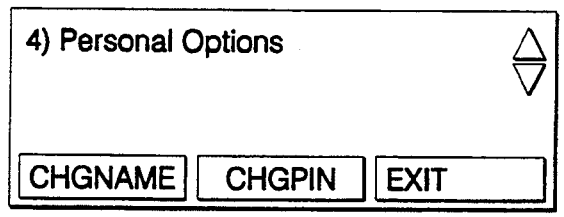

FIG. 31E shows a menu that permits the caller to select specific personal options for the personal number administration service. For example, the caller can change the name associated with the presently registered item by pressing the CHGNAME softkey. Similarly, the caller can change a personal identification number by selecting the CHGPIN softkey. Again, the caller can scroll up or down by pressing the Up or Down scroll keys.

Figure 31F:
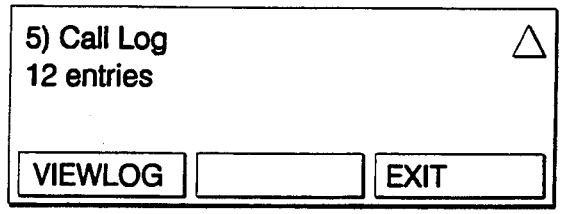

FIG. 31F shows a menu that indicates the personal number administration service has recorded 12 entries for the voice mail call log. To view the voice mail call log, the caller must press the VIEWLOG softkey. As this is the last menu option for the service main menu, the caller can only scroll up through the previous menus by pressing the Up scroll key.

Figure 32A:
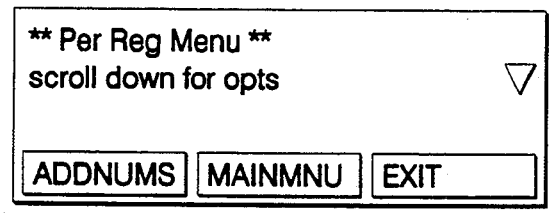
FIGS. 32 A-F are diagrams illustrating additional menus and associated softkeys for the ADSI service shown in FIGS. 31 A-F.

FIG. 32A shows the initial personal registration submenu for the personal number administration service. By use of the Down scroll key, the caller can scroll down for optional menu items. The caller can return to the main menu by pressing the MAINMNU softkey. The caller's selection of the ADDNUMS softkey allows the caller to add a personal registration number to the AIN service.

Figure 32B:
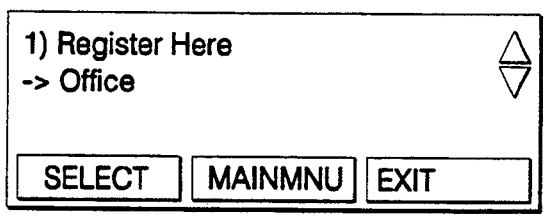

FIG. 32B shows a menu that permits the caller to register a personal number with a particular location, in this case the office. The personal number is assigned to the office if the caller presses the SELECT softkey. However, the caller can return to the main menu of the service by pressing the MAINMNU softkey. The caller has the option of moving up or down through the menu options by pressing the Up or Down softkeys.

Figure 32C:
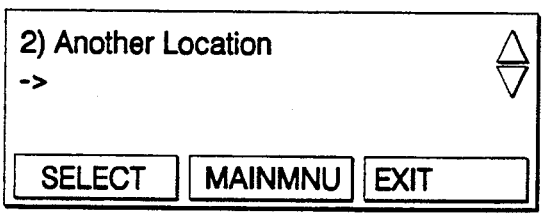

FIG. 32C shows a menu that allows the caller to register its personal number at another location. The caller can enter another location by use of the dial pad. Upon entering the desired location, the caller can press the SELECT softkey to register this location for use with the personal number. Alternatively, the caller can return to the main menu by pressing the MAINMNU softkey. Again, the caller can move up or down the menu options by pressing the Up or Down scroll keys.

Figure 32D:
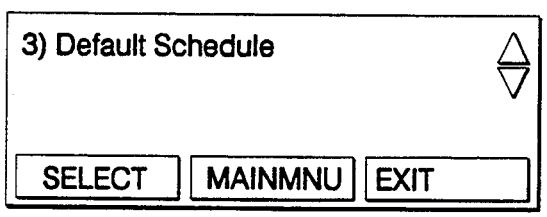

FIG. 32D shows a menu that indicates a default schedule. At the time that the user subscribes to the personal number telephony service, the user can specify a default schedule that assigns the personal telephone number to various specified locations for certain dates and times. If the caller selects this option, the caller's future calls will be routed according to the default schedule. The caller can return to the main menu by pressing the MAINMNU softkey. Again, the caller can move through the menu options by pressing either the Up or Down scroll keys.

Figure 32E:
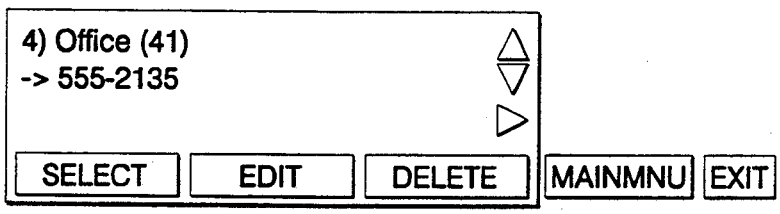

FIG. 32E shows a menu which indicates that the caller's office is at present assigned the telephone number 555-2135. The caller can select this telephone number by pressing the SELECT softkey. If this number is incorrect, the caller can edit the entered number by pressing the EDIT softkey. Furthermore, the caller can delete the entered number by pressing the DELETE softkey. This menu includes two other softkey labels, the MAINMNU softkey and the EXIT softkey. To view those softkeys, the caller must select the horizontal scroll key to cause the display 26 to scroll toward those softkey labels. From this menu option, the caller can return to the main menu by pressing the softkey MAINMNU or exit the menu option by pressing the EXIT softkey.

Figure 32F:
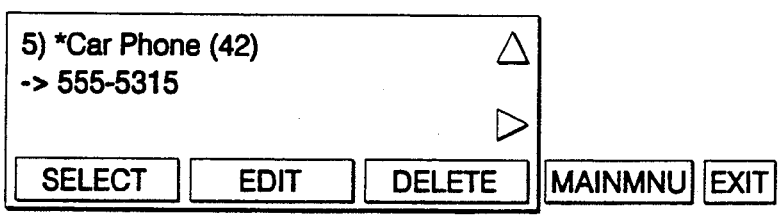

FIG. 32F shows a menu which indicates that the caller's car phone is at present assigned the number 555-5315. If the caller would like to assign this entered number to another location, the caller presses the SELECT softkey. The asterisk appearing adjacent to the displayed telephone number indicates that the telephone is at present registered for the car phone. Accordingly, this assignment is not changed if the caller presses the SELECT softkey. However, to edit the entered number, the caller must press the EDIT softkey. The caller can delete the entered number by pressing the DELETE softkey. Similar to the previous menu option, the caller must use the horizontal scroll key to view the two remaining softkey labels, MAINMNU and EXIT.

Referring now to FIG. 3, the common service circuit frame 36 is typically implemented as a rack of general purpose personal computer systems using model 80386 or model 80486 microprocessors. It will be appreciated that the functions supplied by the adjunct processor 12 can be implemented by one or more of the computers of the common service circuit frame 36. Accordingly, those skilled in the art will understand that the service functions supplied at present by the computer 30 could be implemented by the common service circuit frame 36.

Referring to FIG. 1, the inventors believe that an improvement to the system 10 is to replace the receive-only modem 29 connected to the telephone 14 with a modem having both receive and transmit capabilities. In this manner, a modem-to-modem bidirectional data communications path is provided between the telephone 14 and the adjunct processor 12. The telephone 14 can thereby send data via the receive/transmit modem and over the telephone line 21 to the adjunct processor 12 without the use of DTMF signaling. However, it will be understood that this modem-to-modem communications path also can be supplemented by DTMF signaling.

From the foregoing description of the preferred embodiment, it will be appreciated that the present invention encompasses the objects described hereinabove and overcomes the above cited drawbacks of the prior art. In view of the foregoing description, other embodiments of the present invention will suggest themselves to those skilled in the art. Therefore, the scope of the present invention is to be limited only by the claims below and equivalents thereof.

What is claimed is:

1. A system for communicating textual information to an Analog Display Services Interface (ADSI)-compatible telephone via a public switch telephone network comprising a central office having a service switching point, said ADSI-compatible telephone, which includes a visual display for displaying said textual information, outputs a service selection signal over a telephone line to access an ADSI service providing said textual information and outputs a service disconnect signal over said telephone line to terminate access to said ADSI service, said system comprising:

a service circuit node, connected to said service switching point, for generating said ADSI service including information signals comprising said textual information and telephone instructions; and an adjunct processor, connected to said service circuit node and removably connected to said telephone line, for supplying information data for transmission over said telephone line by processing said information signals, whereby said service circuit node outputs said information signals to said adjunct processor and connects said adjunct processor to said telephone line in response to said service selection signal, and disconnects said adjunct processor from said telephone line in response to said service disconnect signal; and whereby said visual display displays said textual information.

2. The system as recited in claim 1, wherein said telephone instructions include an initial instruction for causing said ADSI-compatible telephone to enter a data operating mode that enables said telephone to display said textual information.

3. The system as recited in claim 2, wherein said adjunct processor supplies initial instruction data for transmission over said telephone line by convening said inital instruction, said ADSI-compatible telephone entering said data operating mode in response to said inital instruction data.

4. The system as recited in claim 3, wherein said adjunct processor comprises;

a modulator/demodulator (modem) for supplying said information data by modulating a carrier in accordance with said information signals;

a dual tone multiple frequency (DTMF) tone processor for supplying said initial instruction data by convening said inital instruction into a sequence of DTMF tones; and a computer, connected to said modem and to said DTMF tone processor, for receiving said information signals and said instruction signals and controlling said modem and said DTMF tone processor.

5. The system as recited in claim 4, wherein said DTMF tone processor responds to said ADSI-compatible telephone outputting a command signal over said telephone line, said command signal having another sequence of DTMF tones and representing a request for additional textual information, by converting said DTMF tones to command data and supplying said command data to said service circuit node.

6. The system as recited in claim 5, wherein said service circuit node generates selected information signals comprising certain textual information and certain telephone instructions in response to said command data.

7. The system as recited in claim 1, wherein said adjunct processor responds to said ADSI-compatible telephone supplying a command signal over said telephone line by providing additional textual information to said ADSI-compatible telephone.

8. The system as recited in claim 7, wherein said adjunct processor responds to said command signal by converting said command signals to command data and supplying said command data to said service circuit node.

9. The system as recited in claim 8, wherein said service circuit node generates selected information signals containing certain textual information and certain telephone instructions in response to said command data.

10. The system as recited in claim 1, wherein said service circuit node comprises:
a switching network for removably connecting said adjunct processor to said telephone line; and
a control computer, connected to said switching network, for running a service program operative to supply instructions for controlling said switching network.

11. The system as recited in claim 10, further comprises a common service circuit frame (CSCF), connected to said control computer and said switching network, operative to support said ADSI service.

12. The system as recited in claim 11, wherein said CSCF supports said ADSI service by supplying at least one telephony service selected from a text-to-voice service, a facsimile service, or a voice mail service.

13. The system as recited in claim 1, wherein said textual information comprises service menus and softkey labels.

14. The system as recited in claim 13, wherein said telephone instructions comprise commands for controlling certain functions of said ADSI-compatible telephone.

15. The system as recited in claim 1, wherein said ADSI service comprises a movie hotline service.

16. The system as recited in claim 1, wherein said ADSI service comprises a voice mail management system.

17. A method for communicating textual information to an ADSI-compatible telephone via a public switch telephone network comprising a central office having a service switching point, said ADSI-compatible telephone, which includes a visual display for displaying said textual information, outputs a service selection signal over a telephone line to initiate access to an ADSI service providing said textual information, comprising the steps:
receiving said service selection signal at a service circuit node connected to said service switching point;
selecting a service program operating on said service circuit node in response to said service selection signal;
connecting said telephone line to an adjunct processor in response to said service selection signal, said adjunct processor connected to said service circuit node;
supplying said ADSI service including information signals containing said textual information and telephone instructions to said adjunct processor from said service circuit node;
transmitting information data over said telephone line in response to said adjunct processor processing said information signals; and
displaying said textual information on said visual display.

18. The method as recited in claim 17, wherein said telephone instructions include an initial instruction for causing said ADSI-compatible telephone to enter a data operating mode that enables said telephone to display said textual information.

19. The system as recited in claim 18 further comprising the step of transmitting initial instruction data over said telephone line in response to said adjunct processor converting said inital instruction, said ADSI-compatible telephone entering said data operating mode in response to said initial instruction data.

20. The method as recited in claim 17 further comprising the step of outputting a command signal from said ADSI-compatible telephone for transmission over said telephone line to receive additional textual information.

21. The method as recited in claim 20 further comprising the step of supplying command data to said service circuit node in response to said adjunct processor converting said command signal.

22. The method as recited in claim 21 further comprising the step of generating a selected one of said information signals containing certain textual information and certain telephone instructions in response to said service circuit node receiving said command data.

23. The method as recited in claim 17 further comprising the step of outputting a service disconnect signal to said service circuit node from said ADSI-compatible telephone via said telephone line to terminate access to said ADSI service.

24. The method as recited in claim 23 further comprising the step of disconnecting said telephone line from said adjunct processor in response to said service disconnect signal.

* * * * *